(12) United States Patent
Hayashi et al.

(10) Patent No.: US 7,302,494 B2
(45) Date of Patent: Nov. 27, 2007

(54) TRAFFIC ENGINEERING METHOD AND NODE APPARATUS USING TRAFFIC ENGINEERING METHOD

(75) Inventors: Shinichi Hayashi, Fukuoka (JP); Hiroshi Kinoshita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 09/885,315

(22) Filed: Jun. 18, 2001

(65) Prior Publication Data

US 2002/0083174 A1 Jun. 27, 2002

(30) Foreign Application Priority Data

Dec. 21, 2000 (JP) ............... 2000-389077

(51) Int. Cl.
*G06F 15/173* (2006.01)
*G06F 15/16* (2006.01)

(52) U.S. Cl. ............... 709/239; 709/224; 709/232; 709/234; 709/223; 709/242

(58) Field of Classification Search ............... 709/225, 709/105, 232, 239, 224, 234, 223, 242
See application file for complete search history.

(56) References Cited

U.S. PATENT DOCUMENTS

| | | | | |
|---|---|---|---|---|
| 5,727,051 A | * | 3/1998 | Holender | 379/112.05 |
| 5,812,549 A | * | 9/1998 | Sethu | 370/389 |
| 5,872,773 A | * | 2/1999 | Katzela et al. | 370/256 |
| 5,940,396 A | * | 8/1999 | Rochberger | 370/408 |
| 6,011,776 A | * | 1/2000 | Berthaud et al. | 370/232 |
| 6,147,971 A | * | 11/2000 | Rochberger et al. | 370/238 |
| 6,272,548 B1 | * | 8/2001 | Cotter et al. | 709/239 |
| 6,424,992 B2 | * | 7/2002 | Devarakonda et al. | 709/203 |
| 6,437,804 B1 | * | 8/2002 | Ibe et al. | 715/736 |
| 6,452,902 B1 | * | 9/2002 | Buyukkoc et al. | 370/235 |
| 6,463,062 B1 | * | 10/2002 | Buyukkoc et al. | 370/395.1 |
| 6,661,773 B1 | * | 12/2003 | Pelissier et al. | 370/228 |
| 6,690,678 B1 | * | 2/2004 | Basso et al. | 370/468 |
| 6,721,899 B1 | * | 4/2004 | Narvaez-Guarnieri et al. | 714/4 |
| 6,738,352 B1 | * | 5/2004 | Yamada et al. | 370/238 |
| 6,754,843 B1 | * | 6/2004 | Lu et al. | 714/4 |
| 6,801,534 B1 | * | 10/2004 | Arrowood et al. | 370/400 |
| 6,904,017 B1 | * | 6/2005 | Meempat et al. | 370/238 |
| 7,050,392 B2 | * | 5/2006 | Valdevit | 370/228 |
| 2006/0109853 A1 | * | 5/2006 | Matsuzawa et al. | 370/400 |
| 2006/0112176 A1 | * | 5/2006 | Liu et al. | 709/223 |

FOREIGN PATENT DOCUMENTS

JP      2000138710      5/2000

* cited by examiner

*Primary Examiner*—William Vaughn
*Assistant Examiner*—Kristie D. Shingles
(74) *Attorney, Agent, or Firm*—Katten Muchin Rosenman LLP

(57) ABSTRACT

A traffic engineering method is provided for optimizing an entire network resource, to a network divided intro a plurality of areas, each area including a plurality of nodes. According to the traffic engineering method, a load-balancing process is performed in each area separately. Thus, a memory capacity required by a node carrying out the load-balancing process can be reduced by a large amount, thereby achieving a high-speed load balancing process.

8 Claims, 32 Drawing Sheets

FIG.5A
FIG.5B
LSP DECISION TABLE
(BEFORE ADJUSTMENT)
LSP DECISION TABLE
(AFTER ADJUSTMENT)
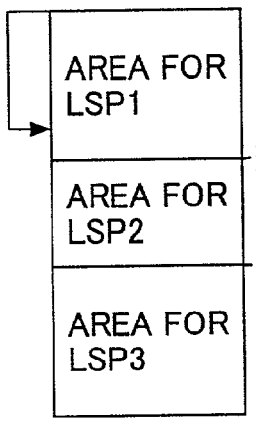
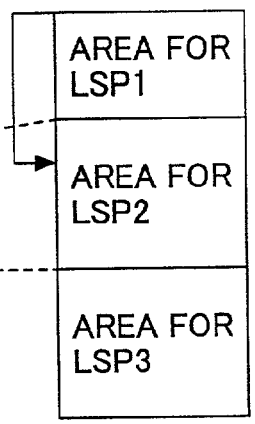

FIG.15

COLLECT TRAFFIC INFORMATION AT EACH NODE (PACKET TRANSMITTING AMOUNT, PACKET DISCARDING AMOUNT, TE BANDWIDTH)

① OBTAIN AND SMOOTH PACKET TRANSMITTING AMOUNT AND PACKET DISCARDING AMOUNT AT EACH NODE, THEN, OBTAIN TRAFFIC INFORMATION OF EACH LINK

② CALCULATE EFFECTIVE LOAD ON LSP, BASED ON TRAFFIC INFORMATION OF EACH LINK (CHANNEL)

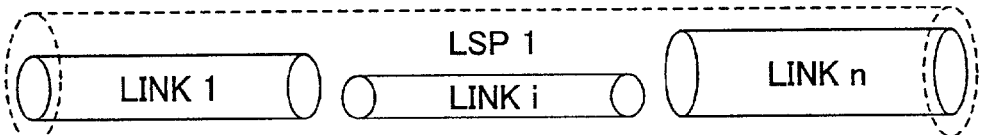

③ CALCULATE USAGE RATE OF TE PATH GROUP, BASED ON EFFECTIVE LOAD ON EACH LSP

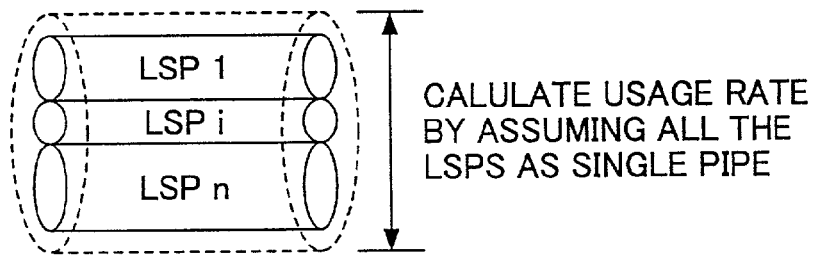

CALULATE USAGE RATE BY ASSUMING ALL THE LSPS AS SINGLE PIPE

④ DETERMINE WHETHER TE PATH GROUP IS CONGESTED, BASED ON USAGE RATE OF TE PATH GROUP

| IP SOURCE ADDRESS | IP DESTINATION ADDRESS | ASSOCIATE POINTER |
|---|---|---|
| | | |

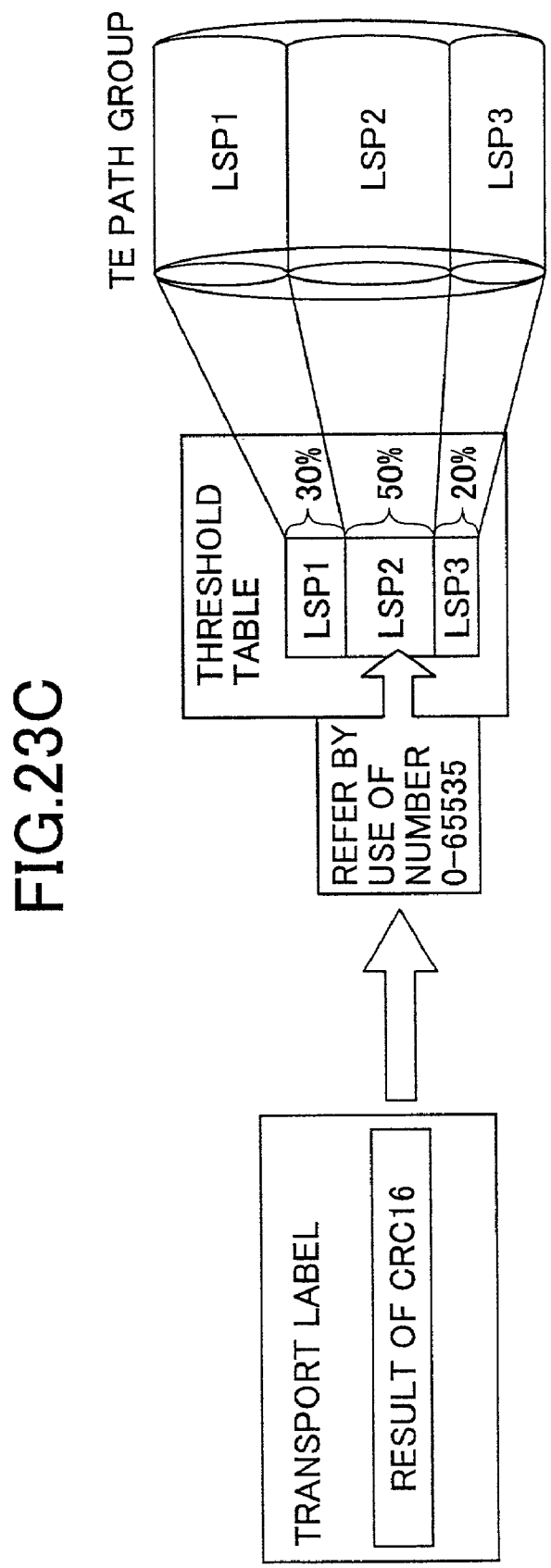

TOTAL AVAILABLE BANDWIDTH − AVAILABLE BANDWIDTH OF LSP1 = 15M − 4M = 11M, WHICH IS GREATER THAN EFFECTIVE LOAD (6M) ON LSP1. TRAFFIC CAN BE REDISTRIBUTED WITHOUT LOSS.

TOTAL AVAILABLE BANDWIDTH − AVAILABLE BANDWIDTH OF LSP1 = 8M − 4M = 4M, WHICH IS LESS THAN EFFECTIVE LOAD (6M) ON LSP1. TRAFFIC CANNOT BE REDISTRIBUTED WITHOUT LOSS.

(BEFORE FAILURE)  (AFTER FAILURE)

(BEFORE FAILURE)  (AFTER SWITCHING PATH)

TRAFFIC ENGINEERING METHOD AND NODE APPARATUS USING TRAFFIC ENGINEERING METHOD

BACKGROUND OF THE INVENTION

1. Field of the Invention

The present invention relates to a traffic engineering method and a node apparatus using the traffic engineering method. More particularly, the present invention relates to a traffic engineering method and a node apparatus using the traffic engineering method in a network.

2. Description of the Related Art

Recently, a great variety of information is being exchanged on the Internet, in areas of not only data communication, but also real-time services providing sounds and images. As a result, the Internet traffic has been increasing rapidly year after year. Thus, a solution is indispensable for a congestion problem on the Internet.

In a network composed of a plurality of nodes, a routing protocol that automatically determines the most appropriate route for forwarding a packet from a source node to a destination node is, for example, an RIP (Routing Information Protocol), an OSPF (Open Shortest Path First), a BGP4 (Border Gateway Protocol Version 4), or an IS-IS (Intermediate System To Intermediate System). In the present network, the most appropriate route for forwarding a packet is determined by use of the above-described protocols, and, then, packet forwarding is carried out on the most appropriate route.

FIG. 1 is a diagram showing a related-art IP packet forwarding process. Generally, each node 10, 11 and 12 shown in FIG. 1 forwards a packet to a destination node by referring to a destination address included in the packet.

A cut-through method has attention as a technology to forward a packet faster than the IP packet forwarding process shown in FIG. 1. For instance, an MPLS (Multi Protocol Label Switching) method is typical of the cut-through method.

FIG. 2 is a diagram showing a related-art IP packet forwarding process by use of the MPLS method. According to the MPLS method, an LSP (Label Switched Path) is initially set on the most appropriate route calculated by a routing protocol, as shown in FIG. 2. Nodes located on both ends of the LSP are called edge nodes 15 and 17. Each node, for example, a node 16 located on the LSP between the edge nodes 15 and 17, or in an MPLS domain, is called a core node.

Next, a label is distributed to each node on the LSP for determining a forwarding direction, by use of an LDP (Label Distribution Protocol). An edge node on a transmitting end, that is, the edge node 15 receives a packet forwarded from the outside of the MPLS domain, and adds a label L1 to the packet. Subsequently, the edge node 15 forwards the packet through the LSP to the core node 16. The core node 16 forwards the packet received from the edge node 15 to an edge node on a receiving end, that is, the edge node 17, by referring to the label L1 and switching the label L1 to a label L2.

At last, the edge node 17 receives the packet from the core node 16, and deletes the label L2 from the packet. The edge node 17, then, forwards the packet to the outside of the MPLS domain. According to the MPLS method, a core node located between edge nodes only needs to forward a packet through a layer 2 by referring to a label, and, thus, a fast packet forwarding process is achieved.

As described above, the fast packet forwarding is achieved by use of the routing protocol and the MPLS technology. However, if traffic increases explosively because of an increase in the number of subscribers on the present Internet, network congestion or packet loss occurs. In conclusion, the MPLS technology has a merit to enable the fast packet forwarding, but has a demerit that the network congestion or the packet loss occurs since the MPLS technology cannot control a packet forwarding path depending on the circumstances by using software such as IP routing in a case in which the traffic is intensive.

Such network congestion and packet loss can be prevented by a traffic engineering (TE), which is a control automatically optimizing entire resources of the network. A traffic engineering function itself does not depend on a layer-2 medium, but is most effectively used on the network as described in the MPLS technology, setting the LSP between a node on a transmitting end and a node on a receiving end.

A load distribution system of the traffic engineering is disclosed in Japanese Priority Application No. 12-12195, for example. The system disclosed in Japanese Priority Application No. 12-12195 sets multi paths LSP1, LSP2 and LSP3 from a transmission node 20 to a reception node 21, as shown in FIG. 3, and distributes traffic of a network among the multi paths LSP1, LSP2 and LSP3, thereby averaging traffic of the entire network.

In detail, in the load distribution system, each node calculates an average usage rate of each link connected to the node, and periodically carries out a flooding process to all the nodes in the load distribution system, in order to recognize a current load on the traffic. The transmission node 20 calculates an effective load on each LSP based on the average usage rate of each link of all the nodes received by the flooding. As illustrated in FIG. 4, the transmission node 20, then, moves the traffic by each micro flow so that the effective loads on all the LSPs become the same value, thereby averaging the loads on the LSPs. The micro flow is a flow used between end users. On the other hand, as illustrated in FIG. 3, an aggregate flow is an aggregation of micro flows having a common destination.

A selection of an LSP, to which a micro flow is mapped, is carried out by use of an LSP decision table shown in FIG. 5A. Every time a new multi path is added to the load distribution system, the number of areas separated in the LSP decision table increases. The transmission node 20 initially calculates a normalized value by using address information included in a packet as a key. The transmission node 20, then, indexes the LSP decision table by use of the normalized value, and decides an LSP, to which the micro flow of the packet is mapped. The transmission node 20 switches the LSP, to which the micro flow is mapped, by moving a boundary of the LSP in the LSP decision table as shown in FIG. 5B, in order to average the traffic of the network. Thus, the load distribution system can distribute the traffic of the network by use of the LSP decision table.

According to the related-art traffic engineering technology described above, a transmission node collects an average usage rate of each link transmitted periodically from all the nodes, and carries out traffic distribution for all the LSPs together after calculating an effective load on each LSP based on the average usage rate of each link. Therefore, the related-art traffic engineering technology enables load balancing in a small-size network. However, the load balancing according to the related-art traffic engineering technology cannot be utilized in a large-size network such as the OSPF routing protocol that includes a plurality of areas, since a load on the transmission node is considerably heavy.

Additionally, according to the related-art traffic engineering technology, in a case in which a route is failed among a plurality of routes, the transmission node can only detect the failed route by using a refresh function of the LDP or detecting a change in a network topology. While searching for the failed route, the load distribution is carried out among the plurality of routes including the failed route. Thus, fast relief of the traffic cannot be achieved by the related-art traffic engineering technology. Additionally, a micro flow such as a TCP (Transmission Control Protocol) connection cannot be relieved.

SUMMARY OF THE INVENTION

Accordingly, it is a general object of the present invention to provide a traffic engineering method and a node apparatus using the traffic engineering method. A more particular object of the present invention is to provide a traffic engineering method and a node apparatus using the traffic engineering method, the traffic engineering method carrying out a high-speed load balancing process regardless of a size of a network, and relieving a traffic loss of a failed route in a case in which a failure occurs on the network.

The above-described object of the present invention is achieved by a traffic engineering method of a network divided into a plurality of areas, each area including a plurality of nodes, the method including the step of carrying out a load-balancing process in the each area separately.

The above-described object of the present invention is also achieved by a node apparatus included in a network that is divided into a plurality of areas, each area including a plurality of nodes, in which an entire network resource is optimized by traffic engineering, the node apparatus including an inside-area destination deciding unit that decides a destination of a packet in the each area, the destination being used for carrying out a load-balancing process within the each area.

The node apparatus using the traffic engineering method according to the present invention can relieve a traffic loss speedily when a failure occurs on a path, on which the load-balancing process is being performed. Thus, the load-balancing process can be performed within each area separately, and a memory capacity required by the load-balancing node can be reduced by a large amount even in a large-size network, thereby achieving the high-speed load balancing process.

Other objects, features and advantages of the present invention will become more apparent from the following detailed description when read in conjunction with the accompanying drawings.

BRIEF DESCRIPTION OF THE DRAWINGS

FIGS. 5A and 5B are diagrams showing LSP (Label Switched Path) decision tables used for mapping a micro flow to an LSP;

FIG. 15 is a diagram showing a method of calculating a usage rate of a TE (Traffic Engineering) path group;

FIGS. 23A, 23B and 23C are diagrams showing a load distributing process;

DESCRIPTION OF THE PREFERRED EMBODIMENTS

A description will now be given of preferred embodiments of the present invention, with reference to the accompanying drawings.

Figure 1:
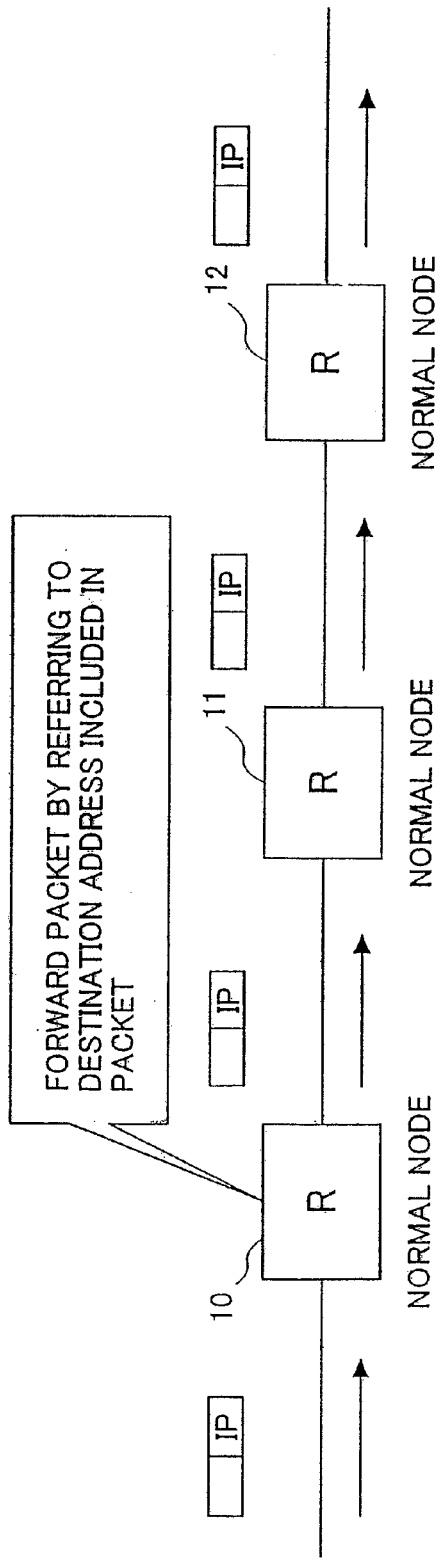
FIG. 1 is a diagram showing a related-art IP packet forwarding process.
Figure 2:
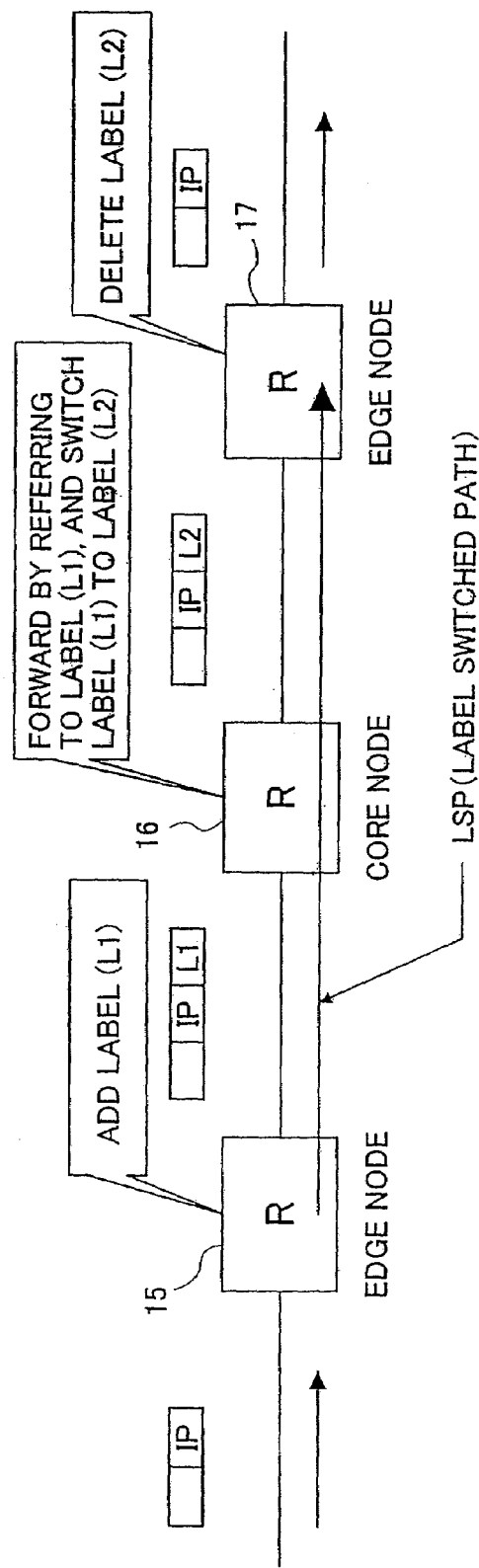
FIG. 2 is a diagram showing a related-art IP packet forwarding process by use of an MPLS (Multi Protocol Label Switching) method.
Figure 3:
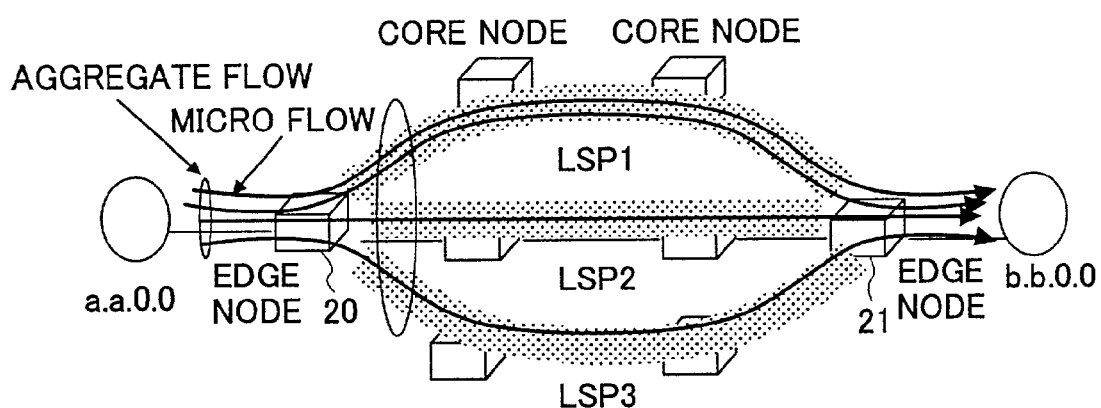
FIG. 3 is a diagram showing a related-art traffic engineering system.
Figure 4:
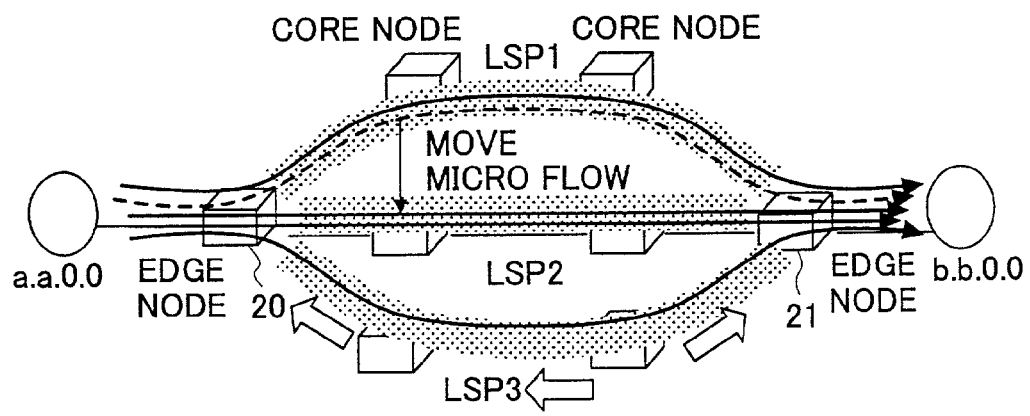
FIG. 4 is a diagram showing a related-art traffic distribution system.
Figure 6:
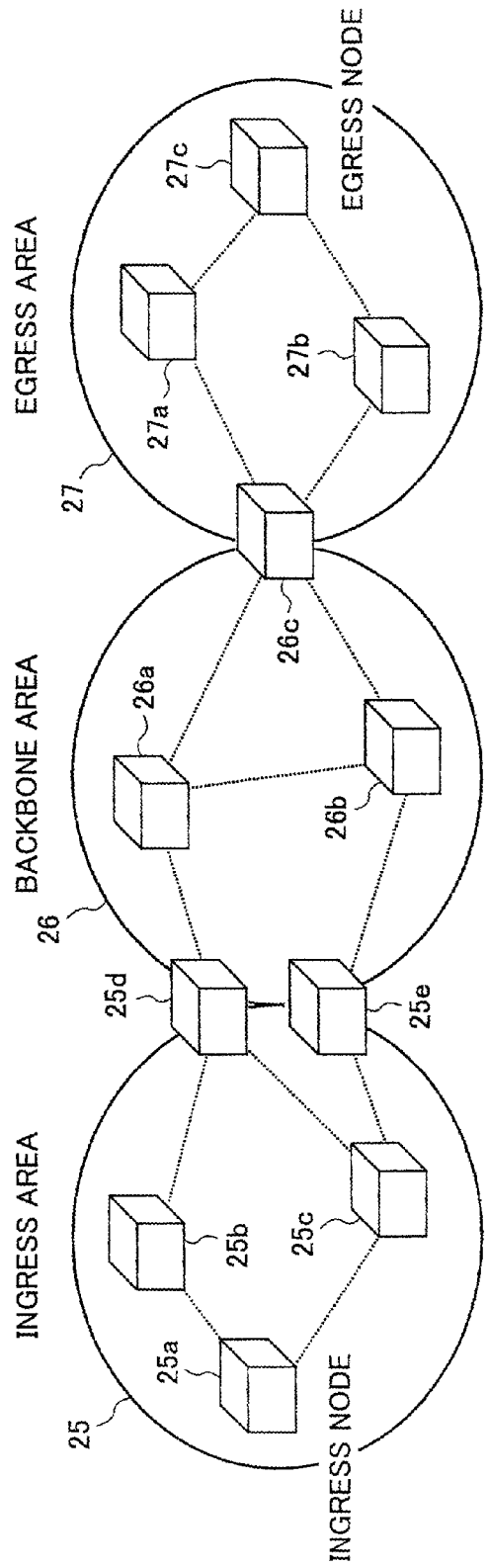
FIG. 6 is a diagram showing a structure of a network system, to which a traffic engineering method according to the present invention is applied.

FIG. 6 is a diagram showing a structure of a network system, to which a traffic engineering method according to the present invention is applied.

In the network system or a network shown in FIG. 6, an OSPF (Open Shortest Path First) is used as a routing protocol. According to the OSPF, the entire network is divided into a plurality of areas, each area being an aggregate of a plurality of nodes. As shown in FIG. 6, the network is composed of areas 25, 26 and 27. The area 25 includes nodes 25a through 25e. The area 26 includes nodes 25d, 25e, and 26a through 26c. Additionally, the area 27 includes nodes 26c, and 27a through 27c.

The nodes 25a and 27c are assumed as an ingress node and an egress node, respectively. Thus, a two-level topology structure connected by the area 26 (a backbone area) is constructed, between the area 25 (an ingress area) and the area 27 (an egress area). Each of the nodes 25d, 25e and 26c recognizes itself as an area boundary node (ABR) by a function of the OSPF. Additionally, an MPLS (Multi Protocol Label Switching) is used as a cut-through method for carrying out fast switching in the network.

Figure 7:
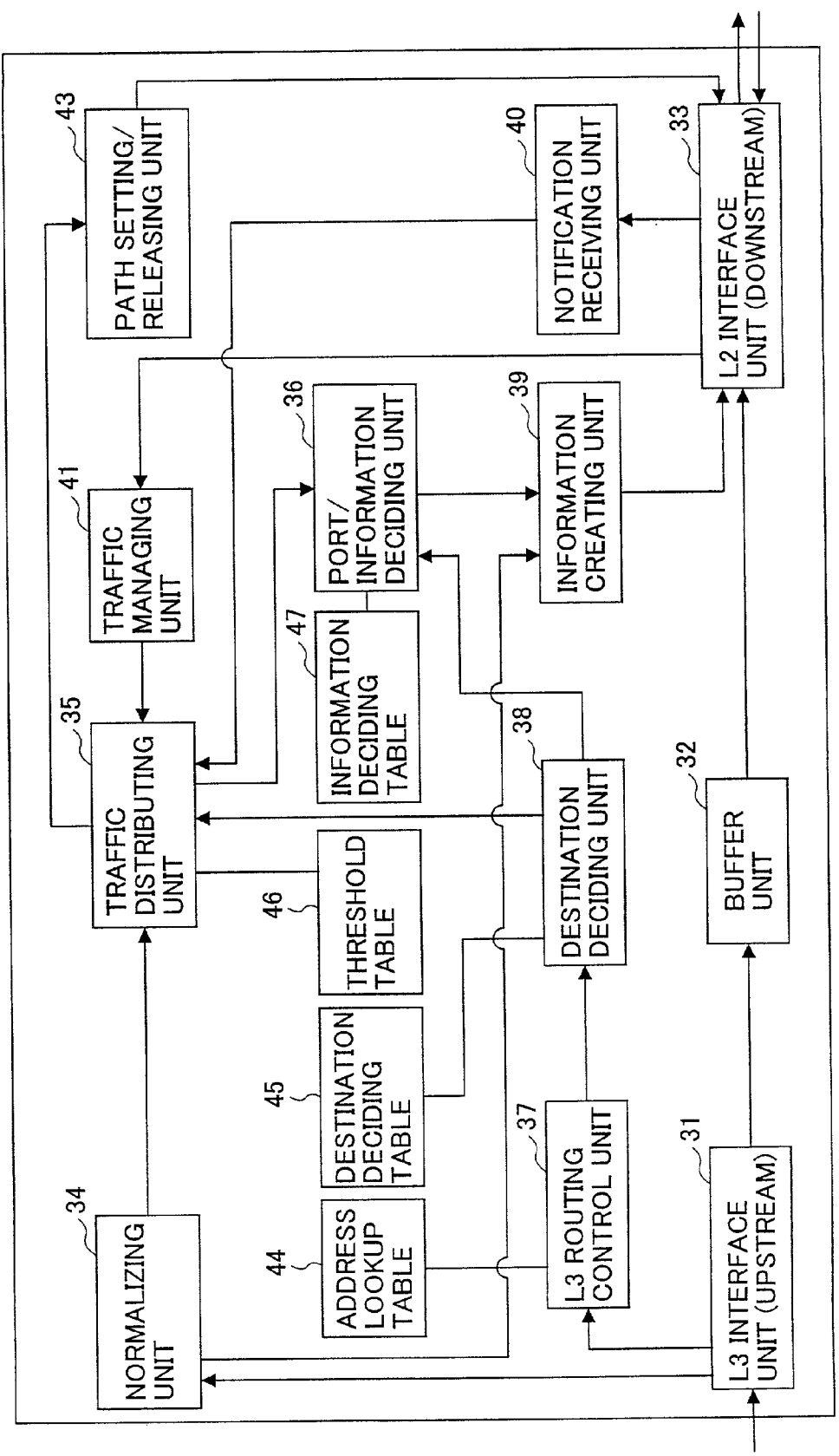
FIG. 7 is a block diagram showing a structure of an edge node on a transmitting end, which is utilized in the traffic engineering method according to the present invention.

FIG. 7 is a block diagram showing a structure of an edge node on a transmitting end, which is utilized in the traffic engineering method according to the present invention. The ingress node 25a shown in FIG. 6 corresponds to the edge node shown in FIG. 7.

The edge node shown in FIG. 7 includes an L3 interface unit 31, a buffer unit 32, an L2 interface unit 33, a normalized-value calculating unit (a normalizing unit) 34, a traffic distributing unit 35, an output-port/switching information deciding unit (a port/information deciding unit) 36, an L3 routing control unit 37, an inside-area destination deciding unit (a destination deciding unit) 38, a switching-information creating unit (an information creating unit) 39, a failure-notification receiving unit (a notification receiving unit) 40, a traffic managing unit 41, a path setting/releasing unit 43, a destination-address lookup table (an address lookup table) 44, an inside-area destination deciding table (a destination deciding table) 45, threshold table 46, and a switching-information deciding table (an information deciding table) 47.

The L3 interface unit 31 carries out a layer-3 accepting process to an IP packet received from an external network, for instance. The buffer unit 32 holds packet information of a layer-3 packet received by each node until a time to add switching information to the layer-3 packet and to transmit the layer-3 packet to the next node on a route. The L2 interface unit 33 transmits the layer-3 packet reflected by information such as layer-3 header information that identifies a micro flow, from a specified output port to the next node.

The normalized-value calculating unit 34 calculates a normalized value used for carrying out a load-balancing process, from the packet information, based on characteristics of actual traffic such as a source address and a destination address. The traffic distributing unit 35 decides which route in a traffic engineering (TE) path group the traffic is assigned to, based on the normalized value calculated by the normalized-value calculating unit 34. Additionally, in a case in which a failure occurs on a route, the traffic distributing unit 35 is notified of a result of determining whether a traffic loss occurs because of carrying out the load-balancing process by use of all the routes except a failed route. If it is recognized that the traffic loss does not occur, the traffic distributing unit 35 redistributes the traffic flowing through the failed route, to the other plurality of routes. On the other hand, if it is recognized that the traffic loss occurs, the traffic distributing unit 35 sets a new route, and switches the traffic flowing through the failed route, to the new route. Subsequently, the traffic distributing unit 35 carries out the load-balancing process.

The output-port/switching-information deciding unit 36 decides a packet output port corresponding to a specified destination and a specified path, and decides every parameter necessary for creating the switching information, at each node. The L3 routing control unit 37 searches for routing information of its own node from the destination address, and selects a route to a destination node, to which the load-balancing process is carried out. The inside-area destination deciding unit 38 decides a destination inside an area instead of a destination in the entire network, which is necessary for carrying out the load-balancing process.

The switching-information creating unit 39 creates the switching information to be forwarded to the next node, and adds the normalized value calculated based on the source address and the destination address, to the switching information. The failure-notification receiving unit 40 receives a failure notification from a failure detecting node, and determines whether the traffic loss occurs because of carrying out the load-balancing process by use of all the routes except the failed route. The traffic managing unit 41 holds traffic information notified from all the nodes in the area. The path setting/releasing unit 43 sets or deletes a path composing the TE path group.

The destination-address lookup table 44 is a search table used for obtaining destination-node information from the destination address. The inside-area destination deciding table 45 is a search table used for deciding which destination range in the area the load-balancing process is carried out, based on the destination-node information. The threshold table 46 is a search table used for obtaining destinations of the traffic to be redistributed (the TE path group and the LSPs) in order to carry out the load-balancing process in the area. The switching-information deciding table 47 is a search table used for obtaining an output destination of the packet and the switching information, based on information related to the destination inside the area and destinations of the traffic to be redistributed.

The inside-area destination deciding unit 38 and the failure-notification receiving unit 40 are newly added to the edge node, according to the present invention. Additionally, the inside-area destination deciding table 45 is added as necessary data to the edge node. Further, the traffic distributing unit 35 and the switching-information creating unit 39 includes additional functions, according to the present invention.

A description will now be given of a process carried out by the ingress node 25a. The L3 interface unit 31 initially receives a layer-3 packet from an external network such as a company or an ISP (Internet Service Provider), and supplies address information included in the packet to the normalized-value calculating unit 34 and the L3 routing control unit 37. Subsequently, the buffer unit 32 stores the packet information.

After receiving the address information from the L3 interface unit 31, the L3 routing control unit 37 specifies a destination node located at the end of a path by searching through the destination-address lookup table 44 by use of a destination address, and supplies destination-node information to the inside-area destination deciding unit 38. A transmission node (an ingress node) according to the related-art traffic engineering method carries out the load-balancing process in a range from the transmission node to the destination node. On the other hand, the ingress node 25a according to the present invention carries out the load-balancing process by each area. Thus, the inside-area destination deciding unit 38 decides a destination, that is, an area boundary node, inside an area including the ingress node 25*a*, by searching through the inside-area destination deciding table 45 by use of the destination-node information obtained by the L3 routing control unit 37. Subsequently, the inside-area destination deciding unit 38 notifies the output-port/switching-information deciding unit 36 and the traffic distributing unit 35 about the destination inside the area.

On the other hand, the normalized-value calculating unit 34, after receiving the address information from the L3 interface unit 31, calculates a normalized value used for carrying out the load-balancing process by applying a normalization function to the address information, and supplies the normalized value to the traffic distributing unit 35 and the switching-information creating unit 39.

The traffic distributing unit 35 decides which route in the TE path group the traffic is assigned to, by referring to the threshold table 46 based on the destination inside the area obtained by the inside-area destination deciding unit 38, and the normalized value calculated by the normalized-value calculating unit 34. Subsequently, the traffic distributing unit 35 notifies the output-port/switching-information deciding unit 36 about the result of deciding which route in the TE path group the traffic is assigned to. Additionally, the traffic managing unit 41 receives traffic information notified periodically from all the nodes in the area through the L2 interface unit 33, and supplies the traffic information to the traffic distributing unit 35.

The output-port/switching information deciding unit 36 searches through the switching-information deciding table 47 by use of the information received from the traffic distributing unit 35 and the inside-area destination deciding unit 38, and decides an output port used for forwarding the packet to the next node, and switching information to be set in the packet. Subsequently, the output-port/switching-information deciding unit 36 notifies the switching-information creating unit 39 about the output port and the switching information.

According to the related-art traffic engineering method, the switching-information creating unit 39 creates the switching information to the next node based on the information supplied from the output-port/switching-information deciding unit 36, and supplies the created switching information to the L2 interface unit 33. On the other hand, the switching-information creating unit 39 according to the present invention adds the normalized value calculated by the normalized-value calculating unit 34 to the switching information, and supplies the switching information to the L2 interface unit 33. The L2 interface unit 33, after receiving the switching information from the switching-information creating unit 39, reflects the contents of the switching information to the packet stored in the buffer unit 32, and transmits the packet from the output port to the next node.

Figure 8:
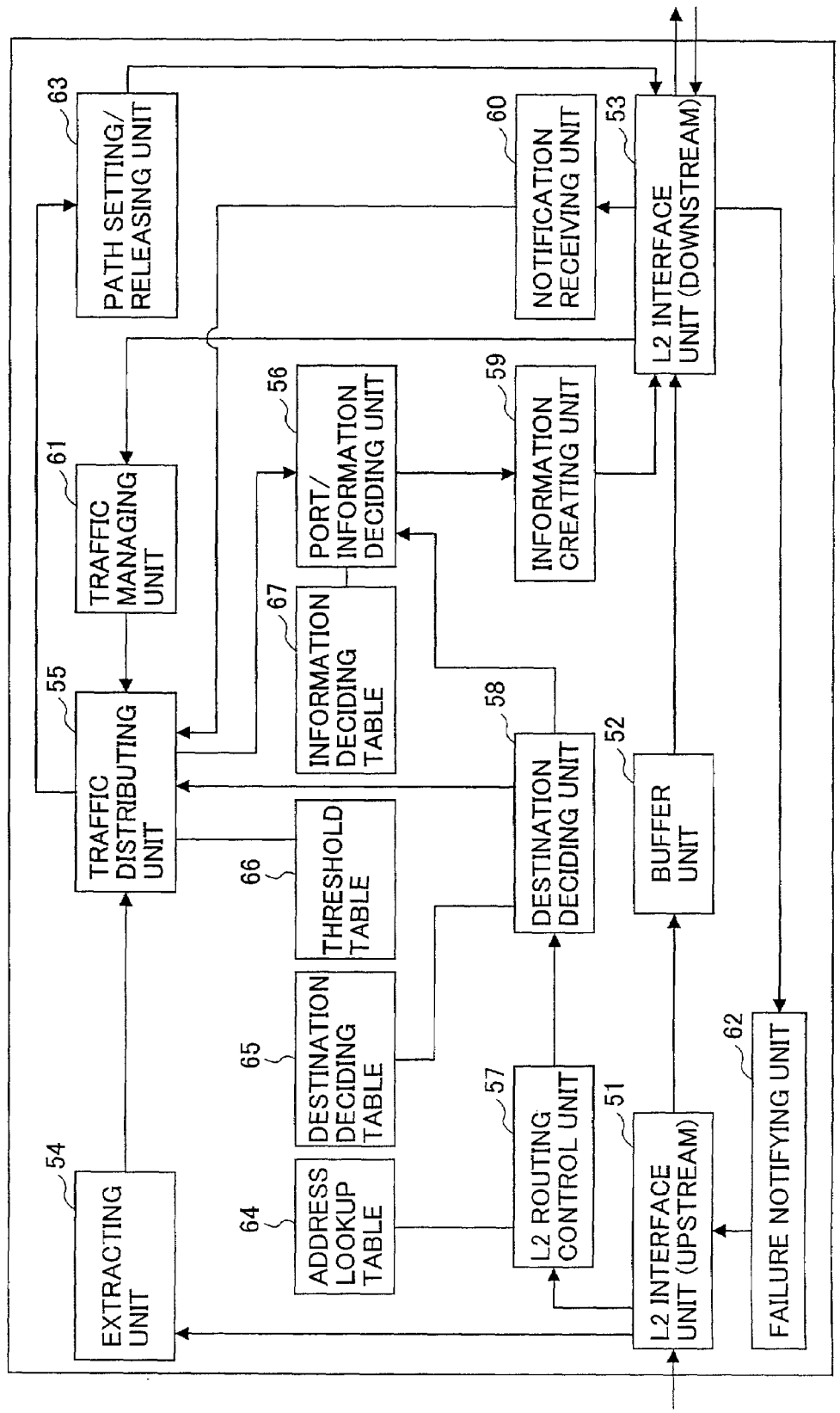
FIG. 8 is a block diagram showing a structure of a core node utilized in the traffic engineering method according to the present invention.

FIG. 8 is a block diagram showing a structure of a core node utilized in the traffic engineering method according to the present invention. The core node shown in FIG. 8 corresponds to the nodes 25*b*, 25*c*, 25*d* and 25*e* of the area 25, the nodes 26*a*, 26*b* and 26*c* of the area 26, and the nodes 27*a*, 27*b* and 27*c* of the area 27.

The core node shown in FIG. 8 includes an L2 interface unit 51 (upstream), a buffer unit 52, an L2 interface unit 53 (downstream), a normalized-value extracting unit (an extracting unit) 54, a traffic distributing unit 55, an output-port/switching-information deciding unit (a port/information deciding unit) 56, an L2 routing control unit 57, an inside-area destination deciding unit (a destination deciding unit) 58, a switching-information creating unit (an information creating unit) 59, a failure-notification receiving unit (a notification receiving unit) 60, a traffic managing unit 61, a failure notifying unit 62, a path setting/releasing unit 63, a destination-address lookup table (an address lookup table) 64, an inside-area destination deciding table (a destination deciding table) 65, a threshold table 66 and a switching-information deciding table (an information deciding table) 67.

The L2 interface unit 51 carries out a process to receive a packet transmitted from a node on an upstream side of the traffic. Additionally, if the core node detects a failure on a route, the L2 interface unit 51 transmits a failure notification to the closest node that carries out the load-balancing process. The buffer unit 52 holds a packet received by each node until a time to transmit the packet to the next node after editing switching information. The L2 interface unit 53 transmits the packet reflected by the switching information on the downstream side, from a specified output port to the next node.

The normalized-value extracting unit 54 extracts a normalized-value used for carrying out the load-balancing process from the switching information. The traffic distributing unit 55 decides which route in the TE path group the traffic is assigned to, by following the normalized value extracted by the normalized-value extracting unit 54. Additionally, in a case in which a failure occurs on a route, the traffic distributing unit 55 is notified of a result of determining whether a traffic loss occurs because of carrying out the load-balancing process by use of all the routes except a failed route. If it is recognized that the traffic loss does not occur, the traffic distributing unit 55 redistributes the traffic flowing through the failed route, to the other plurality of routes. On the other hand, if it is recognized that the traffic loss occurs, the traffic distributing unit 55 sets a new route, and switches the traffic flowing through the failed route, to the new route. Subsequently, the traffic distributing unit 55 carries out the load-balancing process.

The output-port/switching-information deciding unit 56 decides a packet output port corresponding to a specified destination and a specified path, and decides every parameter necessary for creating the switching information, at each node. The L2 routing control unit 57 searches for routing information of its own node from the destination address, and selects a route to a destination node, to which the load-balancing process is carried out. The inside-area destination deciding unit 58 decides a destination inside an area instead of a destination in the entire network, which is necessary for carrying out the load-balancing process.

The switching-information creating unit 59 creates the switching information to be forwarded to the next node, and adds the normalized value calculated based on the source address and the destination address, to the switching information. The failure-notification receiving unit 60 receives a failure notification from the failure detecting node, and determines whether the traffic loss occurs because of carrying out the load-balancing process by use of all the routes except the failed route. The traffic managing unit 61 holds traffic information notified from all the nodes in the area. In a case in which a failure occurs on a route, the failure notifying unit 62 notifies the closest node on the upstream carrying out the load-balancing process from the node having detected the failure. The path setting/releasing unit 63 sets or deletes a path composing the TE path group.

The destination-address lookup table 64 is a search table used for obtaining destination-node information from the destination address. The inside-area destination deciding table 65 is a search table used for deciding which destination range in the area the load-balancing process is carried out based on the destination-node information. The threshold table 66 is a search table used for obtaining destinations of the traffic to be redistributed (the TE path group and the LSPs) in order to carry out the load-balancing process in the area. The switching-information deciding table 67 is a search table used for obtaining an output destination of the packet and the switching information, based on information related to the destination inside the area and destinations of the traffic to be redistributed.

The newly added units according to the present invention are the normalized-value extracting unit 54, the inside-area destination deciding unit 58, the failure-notification receiving unit 60 and the failure notifying unit 62. Additionally, the inside-area destination deciding table 65 is also added as necessary data to the core node. Additionally, the traffic distributing unit 55 includes additional functions according to the present invention. The edge node and the core node are described separately. However, a function of each of the edge node and the core node can be achieved by setting differently in a same apparatus.

A description will now be given of a process carried out by the core node. The core node initially receives a packet transmitted from the previous node on the upstream side by use of the L2 interface unit 51. The L2 interface unit 51, then, supplies switching information included in the packet to the normalized-value extracting unit 54 and the L2 routing control unit 57. Subsequently, the buffer unit 52 stores the packet information.

If the core node is set to a node carrying out the load-balancing process, and is an area boundary node on a path, the L2 routing control unit 57 included in the core node specifies a destination node located at the end of the path, by searching through the destination-address lookup table 64, based on the switching information supplied from the L2 interface unit 51. Subsequently, the L2 routing control unit 57 notifies the inside-area destination deciding unit 58 about destination-node information.

Similarly to the above-described edge node, the inside-area destination deciding unit 58 decides a destination, that is, an area boundary node or a destination node, inside an area including the core node, by searching through the inside-area destination deciding table 65 based on the destination-node information obtained by the L2 routing control unit 57. Subsequently, the inside-area destination deciding unit 58 notifies the output-port/switching information deciding unit 56 and the traffic distributing unit 55 about the destination inside the area.

According to the related-art traffic engineering method, only the ingress node needs to obtain the normalized value used for the load-balancing process. On the other hand, according to the present invention, the load-balancing process is performed inside each area. Thus, the normalized-value extracting unit 54 of the core node shown in FIG. 8 extracts the normalized value necessary for carrying out the load-balancing process inside the area including the core node, and supplies the normalized value to the traffic distributing unit 55.

The traffic distributing unit 55 decides which route in the TE path group the traffic is assigned to, by referring to the threshold table 66 based on the destination inside the area obtained by the inside-area destination deciding unit 58, and the normalized value calculated by the normalized-value calculating unit 54. Subsequently, the traffic distributing unit 55 notifies the output-port/switching-information deciding unit 56 about the result of deciding which route in the TE path group the traffic is assigned to. Additionally, the traffic managing unit 61 receives traffic information notified periodically from all the nodes in the area including the core node through the L2 interface unit 53, and supplies the traffic information to the traffic distributing unit 55.

In a case in which the core node is not a node carrying out the load-balancing process in the area, the normalize-value calculating unit 54 and the traffic distributing unit 55 do not need to carry out the above-described processes. The output-port/switching-information deciding unit 56, the switching-information creating unit 59 and the L2 interface unit 53 operate similarly to the output-port/switching-information deciding unit 36, the switching-information creating unit 39 and the L2 interface unit 33 included in the previously-described edge node. The destination node 27c is not directly related to the load-balancing process, and, thus, a description of the destination node 27c will be omitted. Additionally, the node carrying out the load-balancing process is defined as an area boundary node carrying out the load-balancing process among the core nodes in an area. If the area boundary node is not located on an LSP, the area boundary node does not carry out the load-balancing process.

According to the above-described core node, the load-balancing process can be carried out inside in each area of a large-size network. Thus, the most appropriate traffic engineering can be performed even if the size of the network is large. Additionally, the load-balancing process can be performed during the fast packet forwarding process with advantages of the cut-through packet forwarding method, by inserting the normalized value calculated by the edge node to a packet, and by transmitting the packet to the area boundary node.

A description will now be given of a process carried out by the edge node located on the upstream side to handle a failure occurred on a route.

When the failure occurs on a route, the failure-notification receiving unit 40 of the edge node receives a failure notification transmitted from a core node having detected the failure, through the L2 interface unit 33 of the edge node. Subsequently, the failure-notification receiving unit 40 determines whether the traffic loss occurs in the case of redistributing the traffic flowing through the failed route, to a plurality of routes other than the failed route, based on the traffic information notified from each node. The failure-notification receiving unit 40, then, notifies the result of the above-described determination to the traffic distributing unit 35.

If the traffic distributing unit 35 is notified from the failure-notification receiving unit 40 that the traffic loss does not occur, the traffic distributing unit 35 redistributes the traffic flowing through the failed route, to the plurality of routes other than the failed route. On the other hand, if the traffic distributing unit 35 is notified from the failure-notification receiving unit 40 that the traffic loss occurs, the traffic distributing unit 35 adds a new route different from the failed route, and switches the traffic flowing through the failed route, to the new route, thereby carrying out the load-balancing process.

A description will now be given of a process carried out by a core node in an area to handle a failure occurred on a route.

When the failure occurs on a route, on which the load-balancing process is performed, the failure notifying unit 62 of the core node receives a notification about the failure from the L2 interface unit 53, and transmits a failure notification from the L2 interface unit 51 to the closest node carrying out the load-balancing process, that is either the ingress node or an area boundary node on a packet forwarding path in the area.

On the other hand, if the core node is the node that carries out the load-balancing process in the area, the core node carries out the same process as the edge node if receiving the failure notification from a node having detected the failure. As described above, the node having detected the failure notifies the node carrying out the load-balancing process. The node carrying out the load-balancing process, then, redistributes the traffic flowing through the failed route, to the plurality of routes other than the failed route. Therefore, the traffic engineering method according to the present invention can achieve fast relief of the traffic loss.

Additionally, if the node carrying out the load-balancing process determines that the traffic loss occurs by redistributing the traffic flowing through the failed route, to the route other than the failed route, the node sets a new route, and switches the traffic flowing through the failed route, to the new route. Accordingly, the traffic flowing through the failed route can be relieved.

A description will be further given of detailed embodiments of the present invention.

A default LSP (Label Switched path) is initially set, based on the most appropriate route calculated by the OSPF. Several methods such as an LDP (Label Distribution Protocol) and a RSVP-LSP-Tunnel (an MPLS extended version of the RSVP) are suggested as protocols used for setting an LSP. A default-path setting process is shown in FIG. 9 for a case of using the RSVP-LSP-tunnel.

Figure 9:
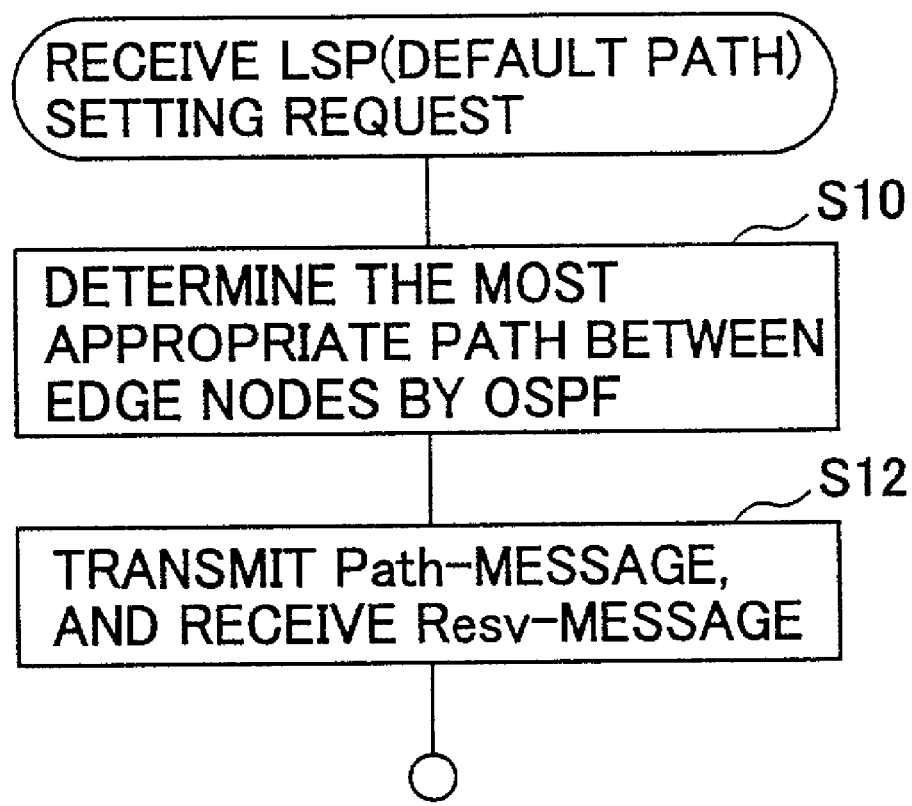
FIG. 9 is a flowchart showing a default-path setting process.
Figure 10:
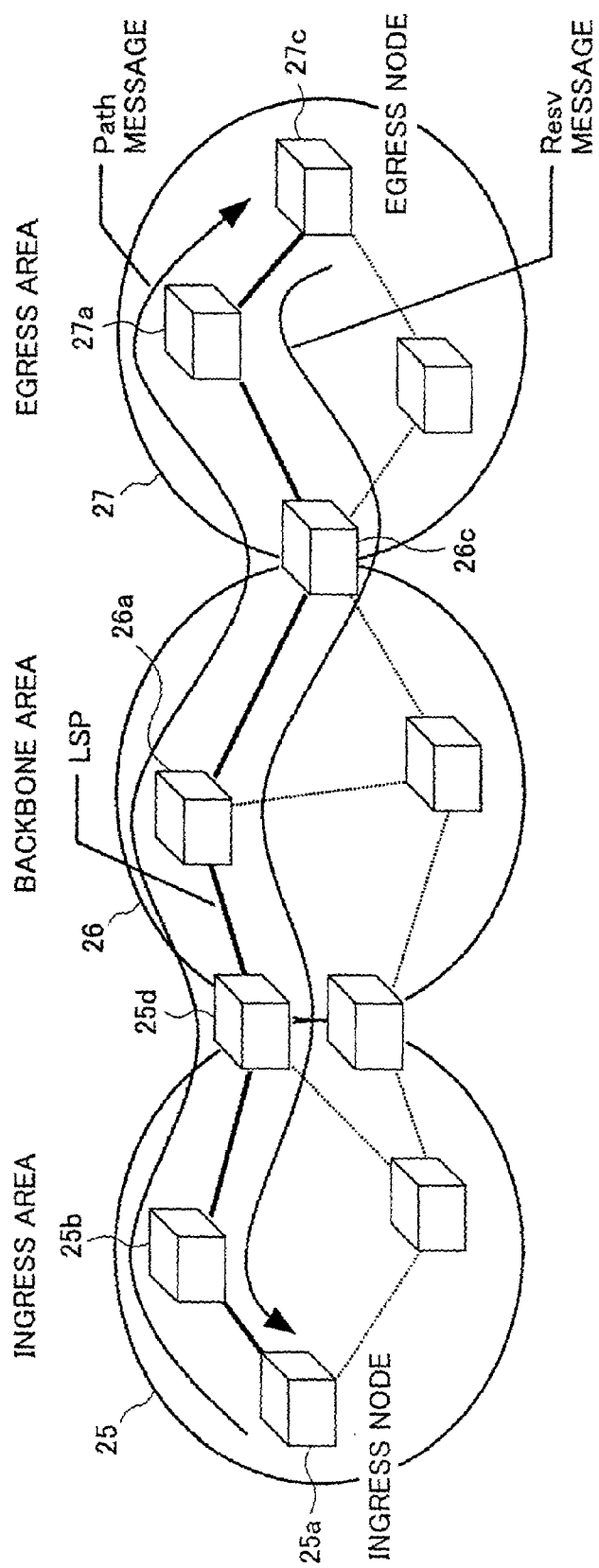
FIG. 10 is a diagram showing a default path set in the network system.

At a step S10 shown in FIG. 9, the path setting/releasing unit 43 of the edge node shown in FIG. 7 or the path setting/releasing unit 63 of the core node shown in FIG. 8 calculates the most appropriate route between the edge nodes 25a and 27c by use of the OSPF, after recognizing a path-setting request. Subsequently, at a step S12, the ingress node 25a transmits a "Path" message that follows the most appropriate route calculated by the path setting/releasing unit 43 or 63, from the L2 interface unit 33 or 55 to the destination (egress) node 27c, as shown in FIG. 10. In response, the destination node 27c transmits a reception message (a "Resv" message) on the reverse route to the ingress node 25a. When the ingress node 25a receives the Resv message from the destination node 27c, a default path (a default LSP) is set for packet forwarding.

Figure 11:
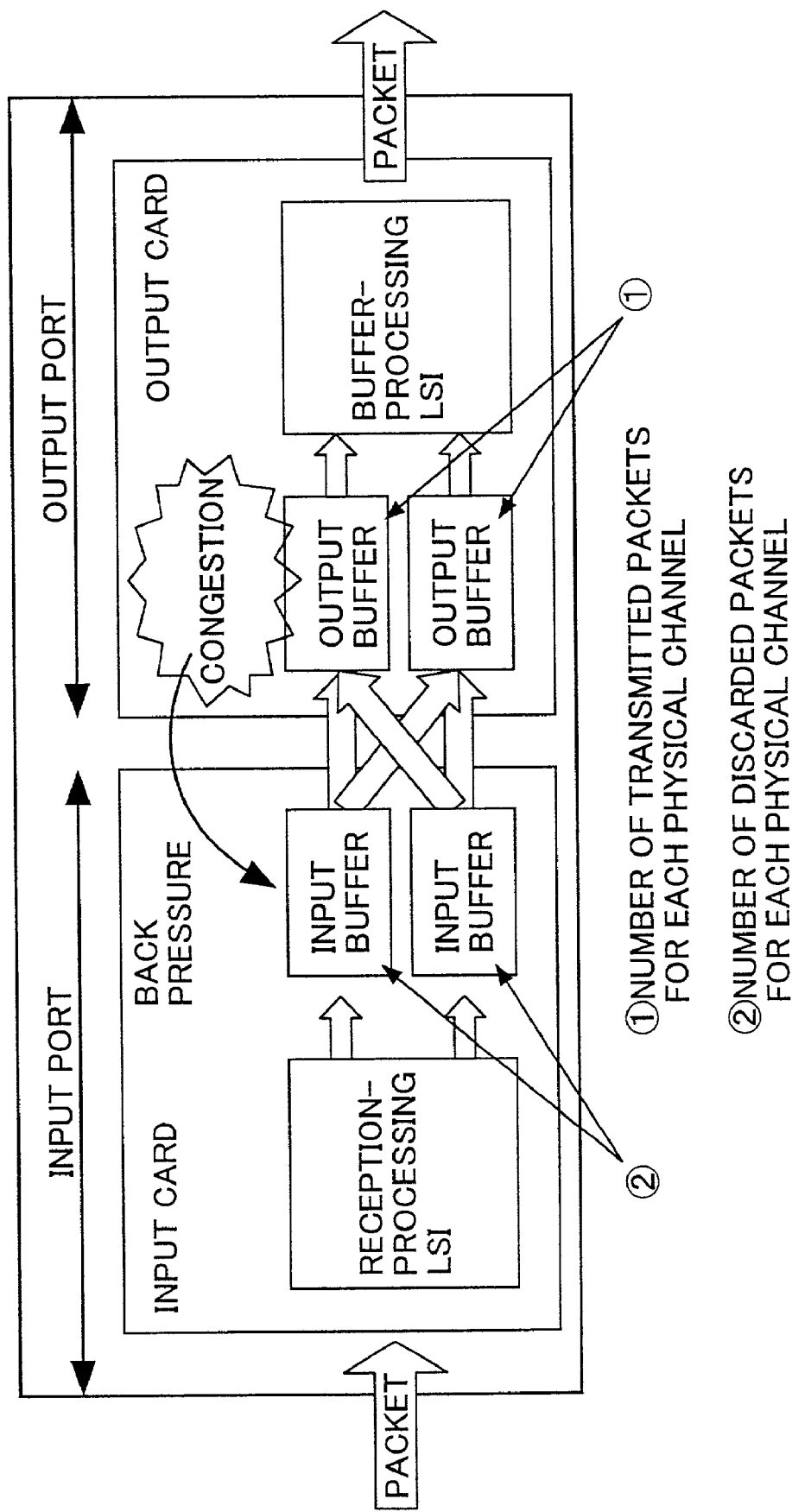
FIG. 11 is a diagram showing collection of traffic information by use of hardware.

After the traffic starts flowing through the default path, each of the nodes 25a, 25b, 25d, 26a, 26c, 27a and 27c periodically collects the number of transmitted packets and the number of discarded packets as statistical information for each physical link (each physical channel) of an output port, by use of hardware, as shown in FIG. 11. Additionally, each of the nodes calculates a usage rate of each physical link based on the number of transmitted packets and the number of discarded packets, and adds the usage rate of each physical link to the statistical information, in order to recognize a current load condition of the traffic at each of the nodes.

Figure 12:
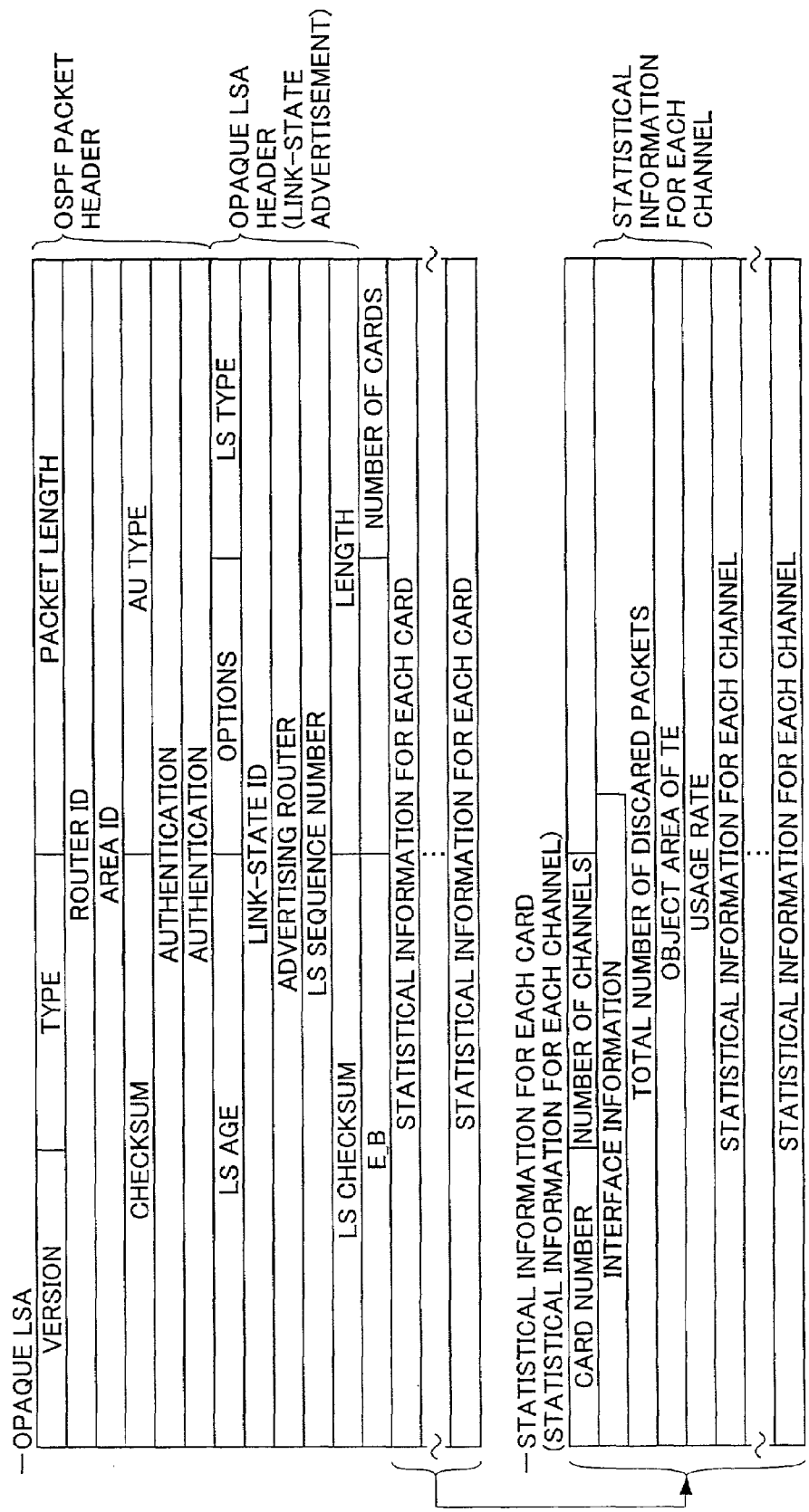
FIG. 12 is a diagram showing a format of an Opaque LSA (Link-State Advertisement) of an OSPF (Open Shortest Path First)

Each node notifies all the other nodes in the area including the each node about the statistical information including an average usage rate for each physical link, by use of an Opaque LSA (Link-State Advertisement) of the OSPF. The Opaque LSA is an LSA extended for a user to use the LSA depending on a general purpose, the LSA being included in a packet of an OSPF message used for exchanging a situation between each node by use of the OSPF message. FIG. 12 is a diagram showing a format of the Opaque LSA of the OSPF. According to the Opaque LSA, the statistical information is stored for the number of cards, after an OSPF packet header and an Opaque LSA header.

Figure 13:
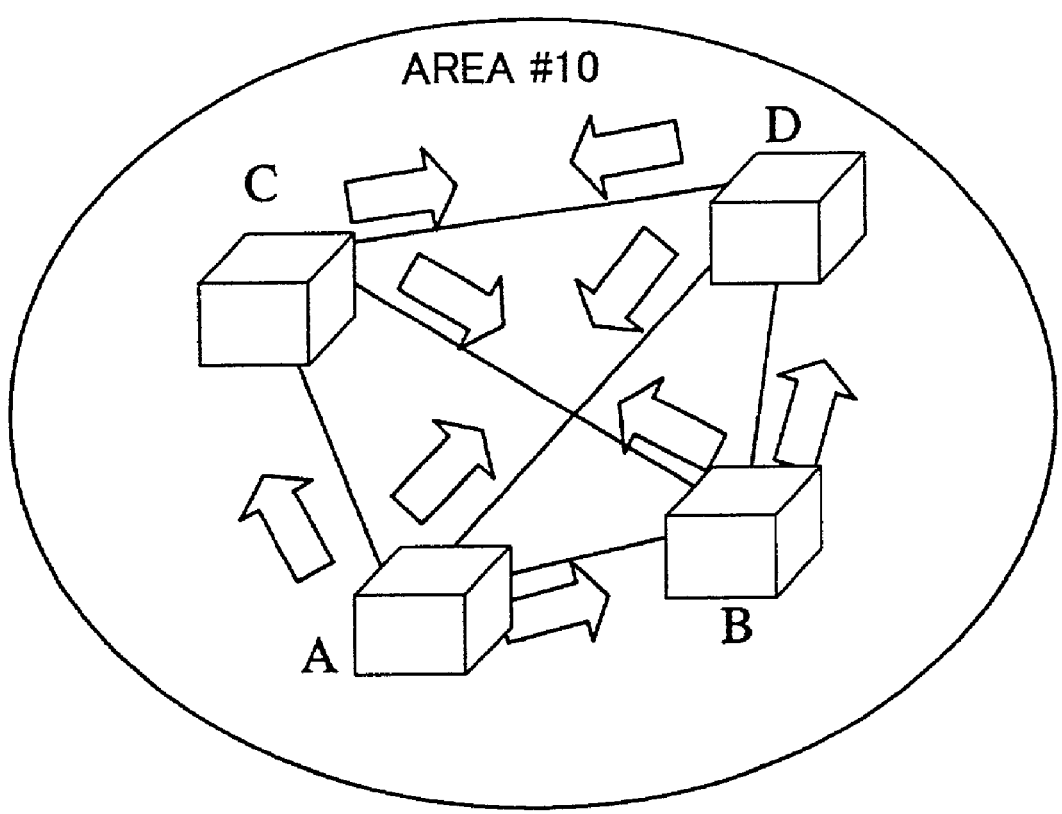
FIG. 13 is a diagram showing an advertising process.

FIG. 13 is a diagram showing an advertising process. An area #10 shown in FIG. 13 includes nodes A, B, C and D. The node A advertises the Opaque LSA to all the adjacent nodes B, C and D. Similarly, each of the nodes B, C and D advertises the Opaque LSA received from the node A to all of its adjacent nodes. However, if a node having received the Opaque LSA receives the same Opaque LSA again, the node discards the Opaque LSA received at the second time. Consequently, advertisement information is created.

According to the related-art traffic engineering method, only the ingress node collects such advertisement information, and manages the advertisement information. However, according to the present invention, a node recognizing itself as an area boundary node on the LSP needs to carry out the load-balancing process in addition to the ingress node. Thus, the traffic managing unit 41 (61) of the ingress node and the area boundary node collects the advertisement information, and manages the advertisement information.

Figure 14:
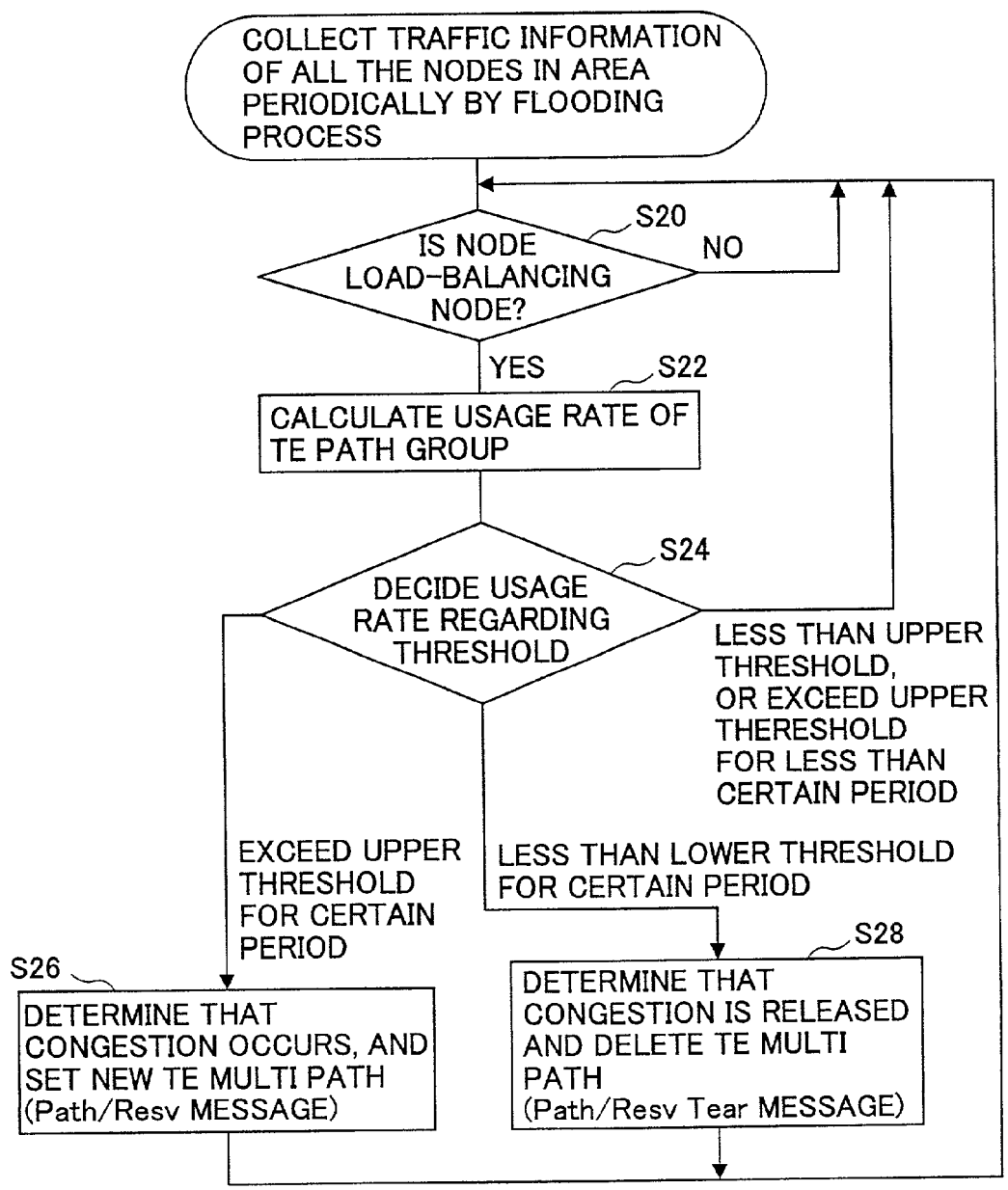
FIG. 14 is a flowchart showing a first embodiment of a load-balancing process.

A description will now be given of a process carried out by a load-balancing node that is a node carrying out the load-balancing process. FIG. 14 is a flowchart showing a first embodiment of the load-balancing process.

A node included in an area periodically collects the traffic information about all the nodes included in the area by the flooding process. At a step S20, it is determined whether the node is a load-balancing node. Only if it is determined at the step S20 that the node is the load-balancing node, the node proceeds to a step S22. At the step S22, the traffic distributing unit 35 (55) of the load-balancing node obtains the average usage rate of each link connected to each node in the area, from the traffic managing unit 41 (61) that has received the average usage rate by the advertising process, and calculates traffic of a TE (Traffic Engineering) path group.

The TE path group is a group of paths including the default path set by the default-path setting process and all the TE multi paths of the default path. A method of calculating the usage rate of the TE path group is shown in FIG. 15, for example. If a label switched path LSP1 is set as the default path including a plurality of links (LINK 1, 2, . . . , i, . . . , n) as shown in FIG. 15, an effective load on the LSP1 is calculated based on the traffic information of each link obtained by the advertising process. Subsequently, the usage rate of the TE path group including LSPs (LSP 1, . . . , i, . . . , n) is calculated, based on the effective load on each LSP.

Figure 16:
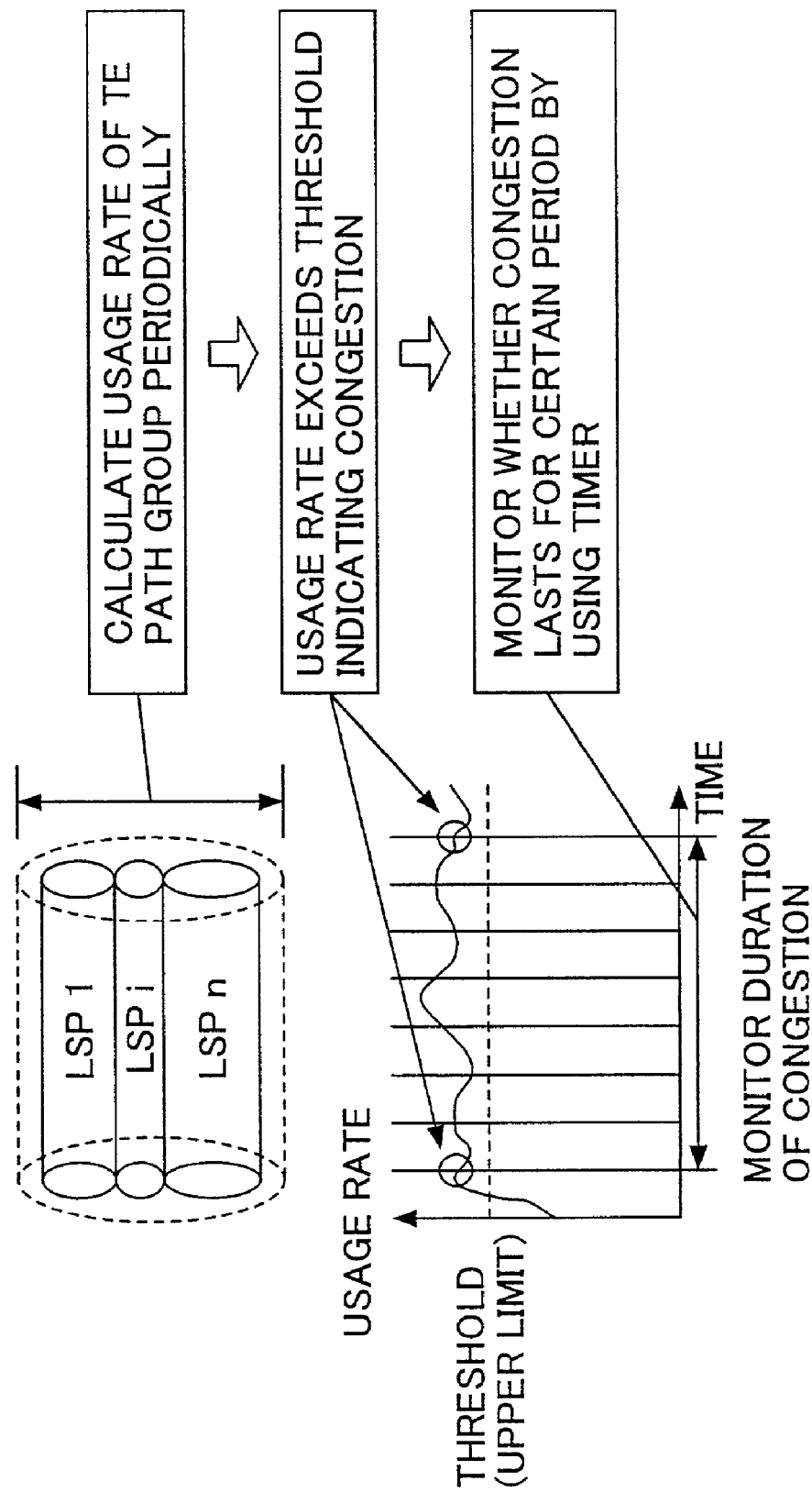
FIG. 16 is a diagram showing a process to monitor and decide a congestion condition.

At a step S24 shown in FIG. 14, the 25 traffic distributing unit 35 (55) of the load-balancing node calculates the usage rate of the TE path group periodically, as shown in FIG. 16. If the usage rate of the TE path group exceeds an upper threshold continuously for a certain period, the traffic distributing unit 35 (55) determines that the default path is congested, and directs the path setting/releasing unit 43 (63) to add a new TE multi path, at a step S26 shown in FIG. 14.

Figure 17:
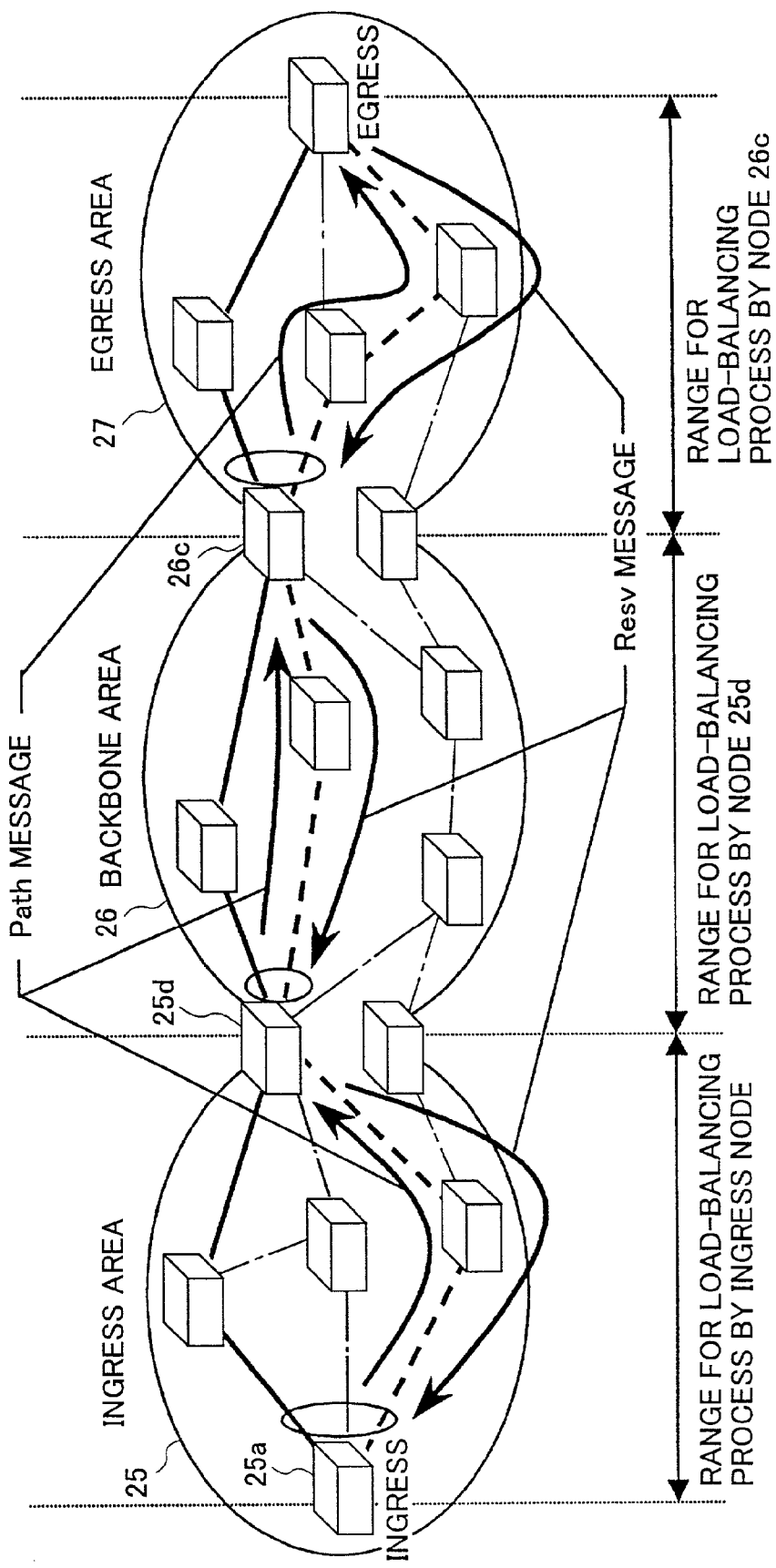
FIG. 17 is a diagram showing a TE multi path setting process for each area.

In the related-art traffic engineering method, a range of setting a TE multi path is same as a range of setting the default path from the ingress node to the egress (the destination node). On the other hand, a range of setting the TE multi path according to the present invention is limited inside each area 25, 26 and 27, as shown in FIG. 17. It should be noted that a solid line, a chained line and a broken line shown in FIG. 17 are respectively an LSP set as the default path, an LSP set as an existing multi path, and an LSP added as a new multi TE path. Additionally, the nodes 25a, 25d and 26c are the load-balancing nodes.

Each of the load-balancing nodes 25*a*, 25*d* and 26*c* repeats the above-described processes, in accordance with a congestion situation. Every time it is determined that the TE path group is congested because of increased traffic, each load-balancing node adds a new TE multi path. On the other hand, if the usage rate (the traffic) of the TE path group is less than a lower threshold, each load-balancing node determines that the congestion is released, and deletes the newly added TE multi path, at a step S28 shown in FIG. 14.

A description will now be given of a second embodiment of the load-balancing process, with reference to a flowchart shown in FIG. 18. This load-balancing process is performed when the ingress node 25*a* receives a packet from the outside of the MPLS domain through its L3 interface unit 31.

Figure 18:
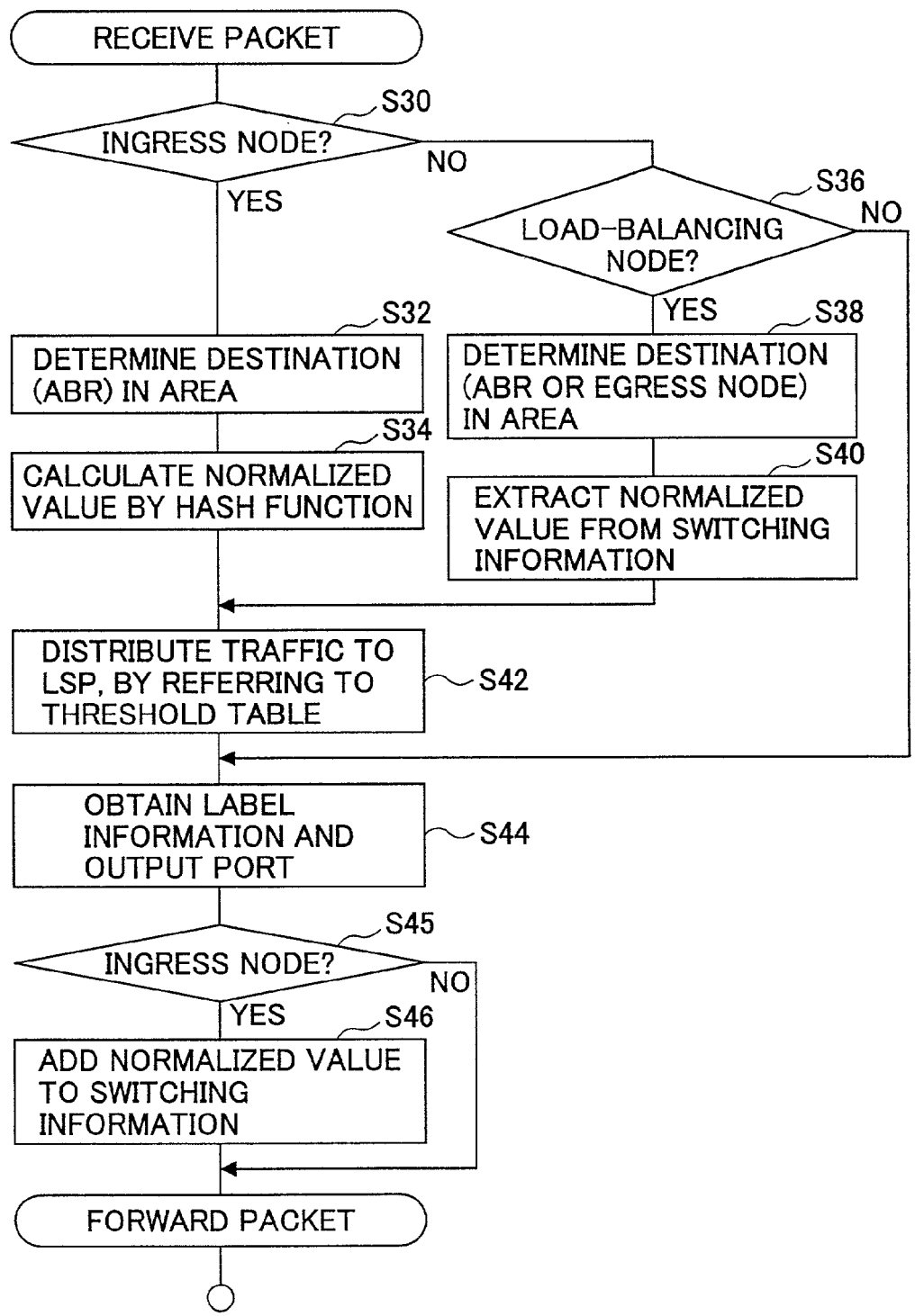
FIG. 18 is a flowchart showing a second embodiment of the load-balancing process.
Figures 19, 20:
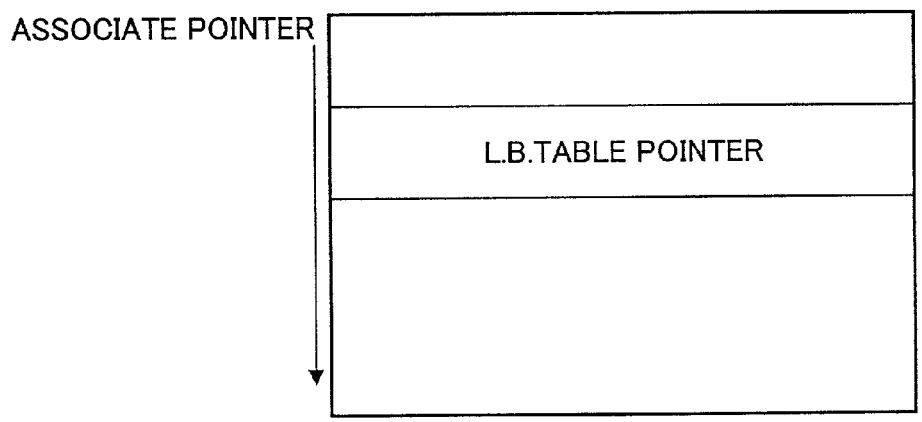
FIG. 19 is a diagram showing a composition of a destination-address lookup table.
FIG. 20 is a diagram showing a composition of an inside-area destination deciding table.

At a step S30 shown in FIG. 18, a node decides whether the node is the ingress node. If it is determined at the step S30 that the node is the ingress node, the node proceeds to a step S32. At the step S32, the L3 routing control unit 37 of the node searches through the destination-address lookup table 44 shown in FIG. 19, by use of a destination address extracted from the packet, thereby determining an associate pointer corresponding to the destination node located at the end of the packet forwarding path. Subsequently, the inside-area destination deciding unit 38 searches through the inside-area destination deciding table 45 shown in FIG. 20 by use of the associate pointer, and determines a load-balancing table pointer (an L. B. table pointer) corresponding to a load-balancing destination. The load-balancing destination is not a destination to the destination node, but is a destination, which is used for carrying out the load-balancing process in an area. Subsequently, at a step S34, the normalized-value calculating unit 34 calculates a normalized value (0-65535) based on an IP source address and an IP destination address included in the packet, by using a hash function (CRC16), and proceeds to a step S42.

On the other hand, if it is determined at the step S30 that the node is not the ingress node, the node proceeds to a step S36, and decides whether the node is a load-balancing node. If it is determined at the step S36 that the node is the load-balancing node, the node is also an area boundary node, and proceeds to a step S38. At the step S38, the L2 routing control unit 57 searches through the destination-address lookup table 64 based on a value of a label added to the packet by the MPLS, and obtains the associate pointer. The searching speed may be increased by use of hardware having a special memory such as a CAM. Subsequently, the inside-area destination deciding unit 58 searches through the inside-area destination deciding table 65, and decides the load-balancing table pointer corresponding to the load-balancing destination. At a step S40, the normalized-value extracting unit 54, then, extracts the normalized value added to switching information, and proceeds to the step S42.

Figure 21:
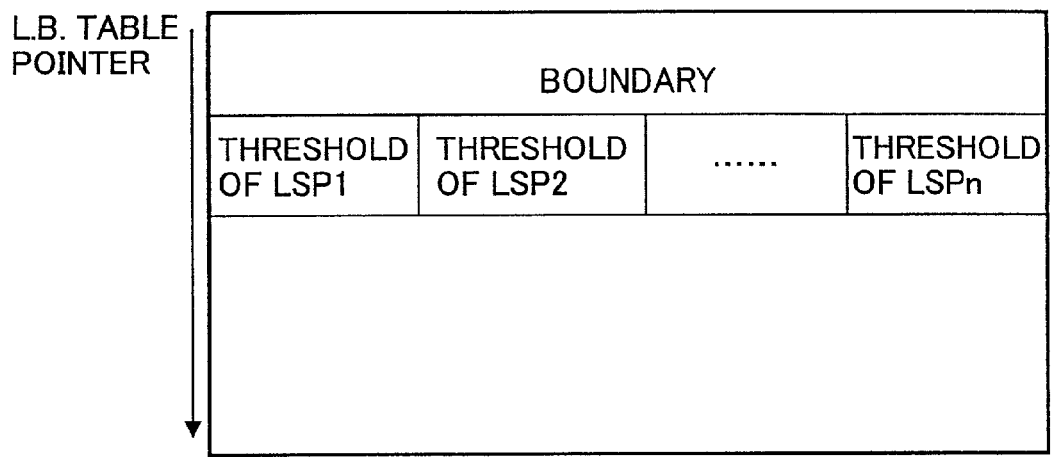
FIG. 21 is a diagram showing a composition of a threshold table.
Figure 23A:
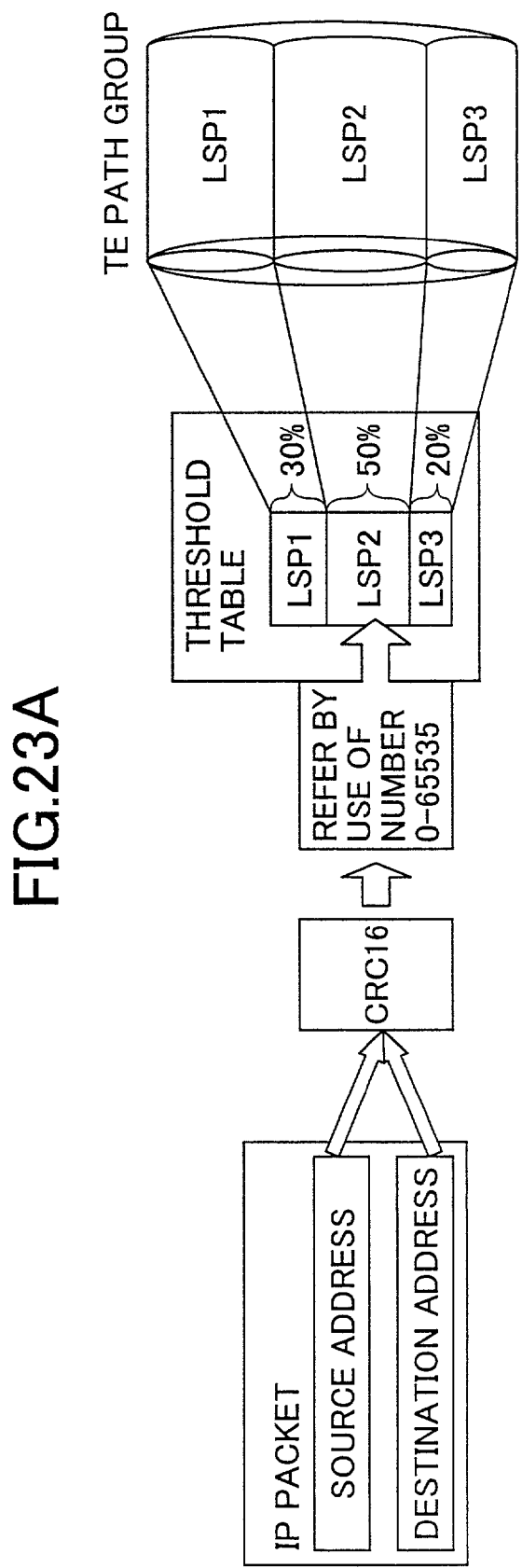

At the step S42, the traffic distributing unit 35 (55) searches for an area through the threshold table 46 (66) shown in FIG. 21, by use of the load-balancing table pointer. The area corresponding to the load-balancing table pointer in the threshold table 46 (66) includes a plurality of thresholds indicating what ratio the load-balancing process should be performed for each LSP included in the TE path group. For example, in a case in which the TE path group including a single default path and two TE multi paths carries out the load-balancing process, the area of the threshold table 46 (66) that stores the plurality of thresholds is divided into three areas by two load-distributing boundary values, each area corresponding to one of the paths LSP1, LSP2 and LSP3, as shown in FIG. 23A.

A total area of the three areas corresponding to the paths LSP1, LSP2 and LSP3 in the threshold table 46 (66) is assigned in a range of the normalized value (0-65535), and, thus, the traffic distributing unit 35 (55) can determine which LSP in the TE path group the traffic is distributed to, by comparing the normalized value with areas inside the threshold table 46 (66). Additionally, every time a TE multi path is added to the TE path group at the step S26 shown in FIG. 14, or every time the TE multi path is removed from the TE path group at the step S28 shown in FIG. 14, the number of the load-distributing boundary values increases or decreases in the area corresponding to the TE path group in the threshold table 46 (66). Thus, the load-distributing boundary values are set again in the area.

Figure 22:
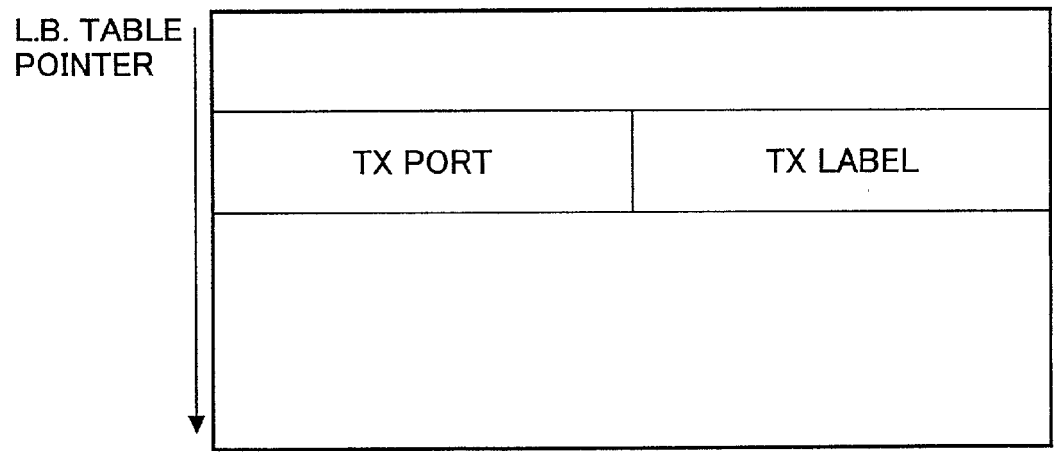
FIG. 22 is a diagram showing a composition of a switching-information deciding table.

At a step S44, the output-port/switching-information deciding unit 36 (56) receives the load-balancing destination in the area, from the inside-area destination deciding unit 38 (58), and information about which LSP the traffic is distributed to, from the traffic distributing unit 35 (55). Additionally, the output-port/switching-information deciding unit 36 (56) searches through the switching-information deciding table 47 (67) shown in FIG. 22, based on the load-balancing destination and the information received respectively from the inside-area destination deciding unit 38 (58) and the traffic distributing unit 35 (55), and, then, obtains label information to be added to the packet when outputting the packet to the next node, and an output port through which the packet is outputted.

Figure 23B:
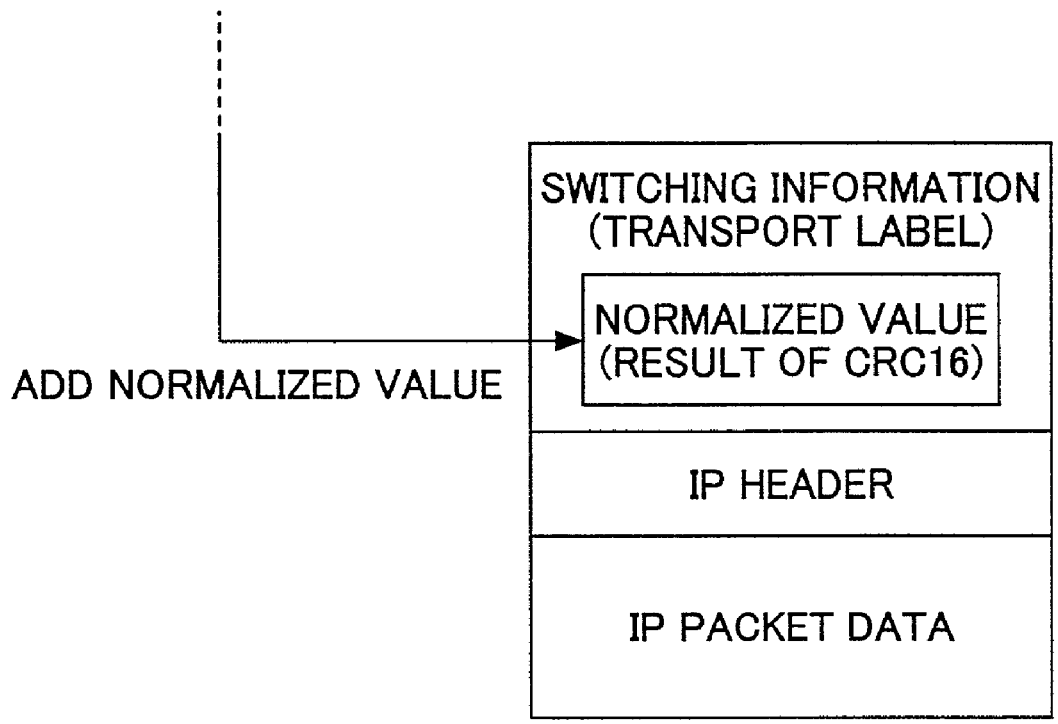

At a step S45, the node decides whether the node is the ingress node. According to the present invention, only if it is determined at the step S45 that the node is the ingress node, the node proceeds to the step S46, and adds the normalized value calculated by the hash function to the switching information created by the switching-information creating unit 39 (59), as shown in FIG. 23B. Then, the switching information is outputted to the next node.

According to the step S46, the ingress node adds the normalized value to the switching information included in the packet, and transmits the packet to the next node on the packet forwarding path. Since an area boundary node on the packet forwarding path also carries out the load-balancing process similarly to the ingress node, the normalized-value extracting unit 54 of the area boundary node having received the packet refers to the normalize value added by the ingress node to the switching information included in the packet, as shown in FIG. 23C. Accordingly, the area boundary node can carry out a load distributing process similarly to the ingress node. In other words, in a case in which a load-balancing node is an area boundary node, the load-balancing node does not need to calculate a normalized value from a destination address, just by using the normalized value calculated by the ingress node, thereby achieving a fast packet forwarding.

A description will now be given of a situation in which a failure occurs on a path, provided that the load-balancing process is being performed on a plurality of paths as described above.

Figure 24:
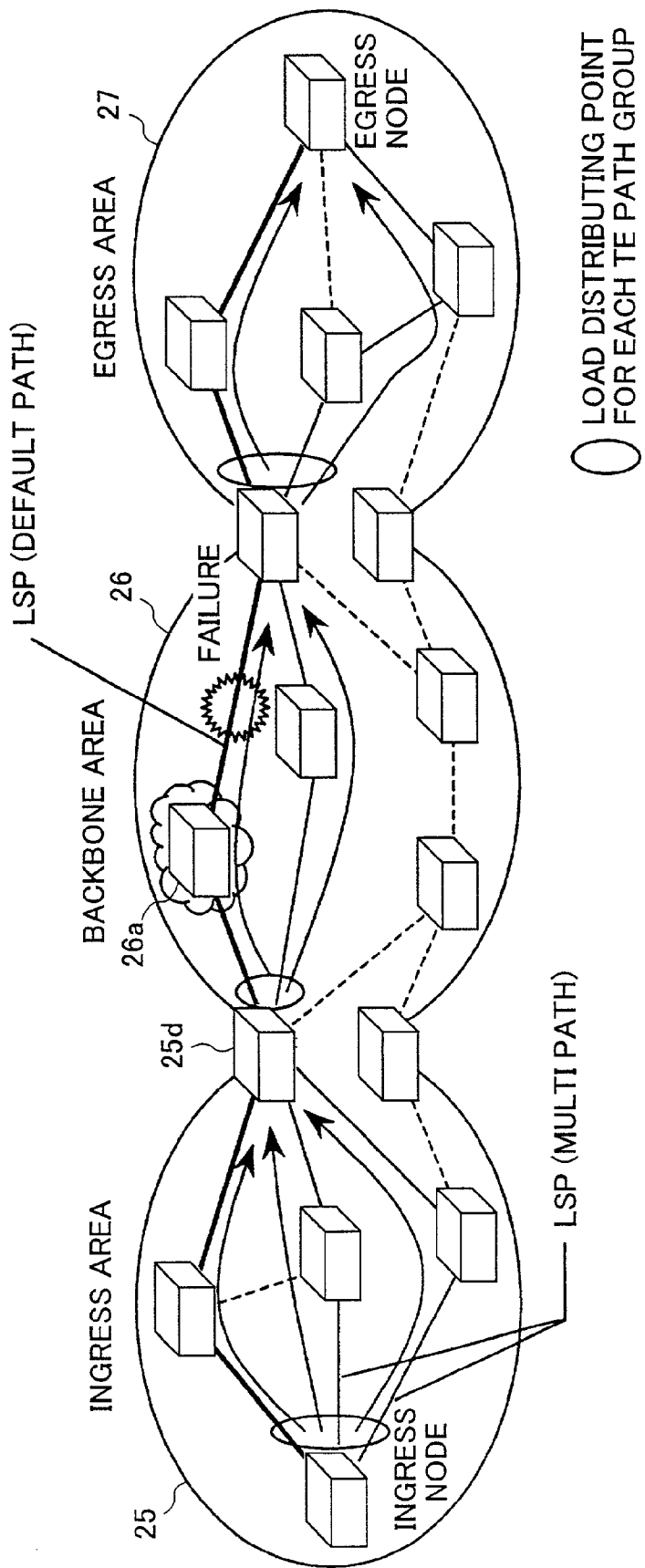
FIG. 24 is a diagram showing failure detection during the load-balancing process.

If a link failure or a node failure occurs on a multi path, on which the load-balancing process is being carried out, such failure is detected by recognizing a change in a topology by use of, for instance, a Hello protocol of the OSPF exchanged between adjacent nodes in a comparatively long default thirty-seconds cycle, according to the related-art traffic engineering method. On the other hand, according to the present invention, the failure is recognized earlier than the related-art traffic engineering method, by carrying out failure notification triggered by detection of an LOS (Loss Of Signal) or an LOF (Loss Of Frame) of each link, as an existing hardware function. In FIG. 24, the core node 26a recognizes the failure.

Figure 25:
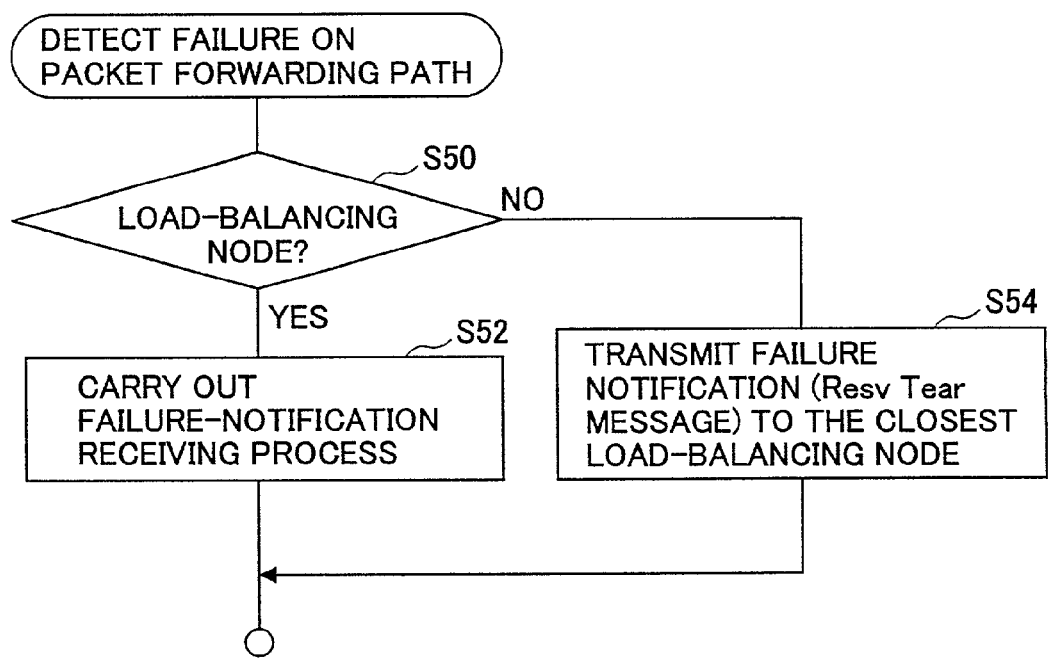
FIG. 25 is a flowchart showing a process carried out by a failure notifying unit of a node detecting a failure.
Figure 26:
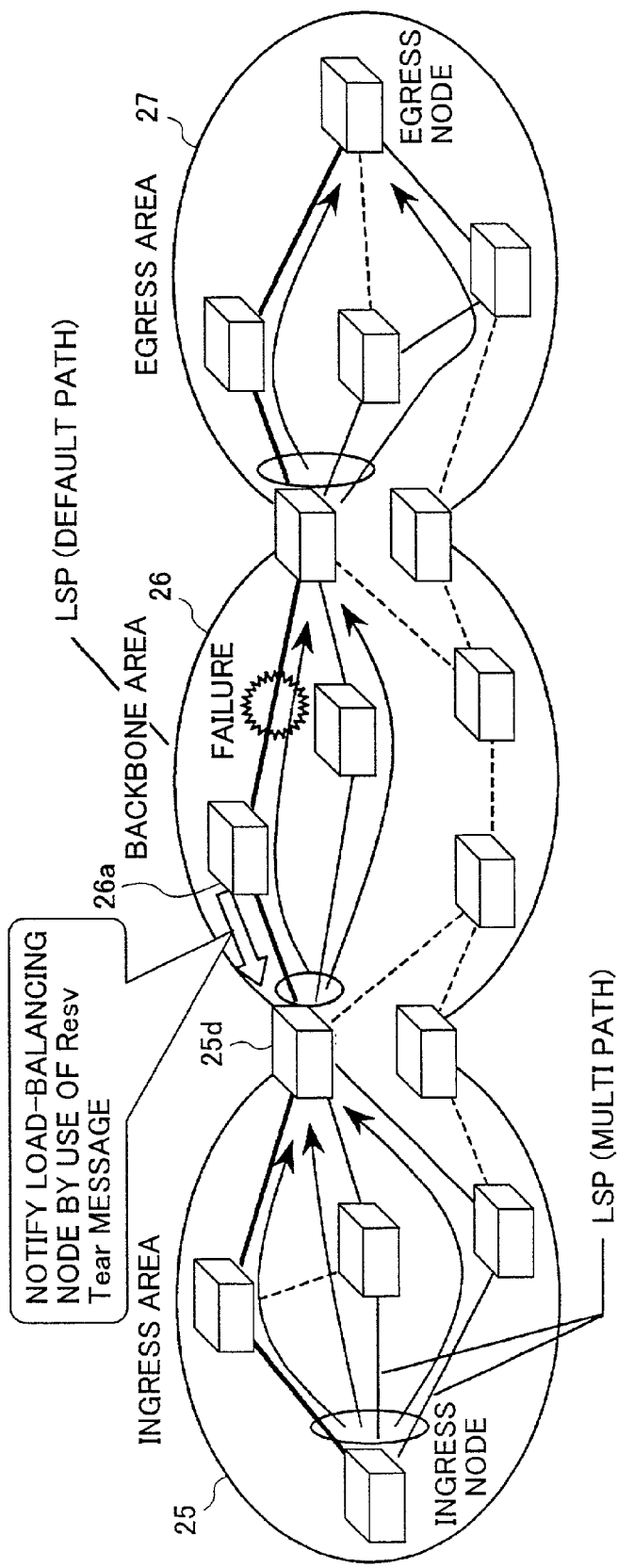
FIG. 26 is a diagram showing failure notification to a load-balancing node.

FIG. 25 is a flowchart showing a process carried out by the failure notifying unit 62 of a node having detected a failure. At a step S50 shown in FIG. 25, the failure notifying unit 62 of the node decides whether the node is a load-balancing node. If it is determined at the step S50 that the node is the load-balancing node, the failure notifying unit 62 does not need to notify about the failure, and, thus, the node carries out a later-described failure-notification receiving process, at a step S52. On the other hand, if it is determined at the step S50 that the node is not the load-balancing node, the failure notifying unit 62 of the node notifies the closest load-balancing node on the upstream side of the packet forwarding path, that is, the ingress node or an area boundary node, about the failure, at a step S54. For instance, the core node 26a having detected the failure notifies the area boundary node 25d about the failure, as shown in FIG. 26.

Figure 27:
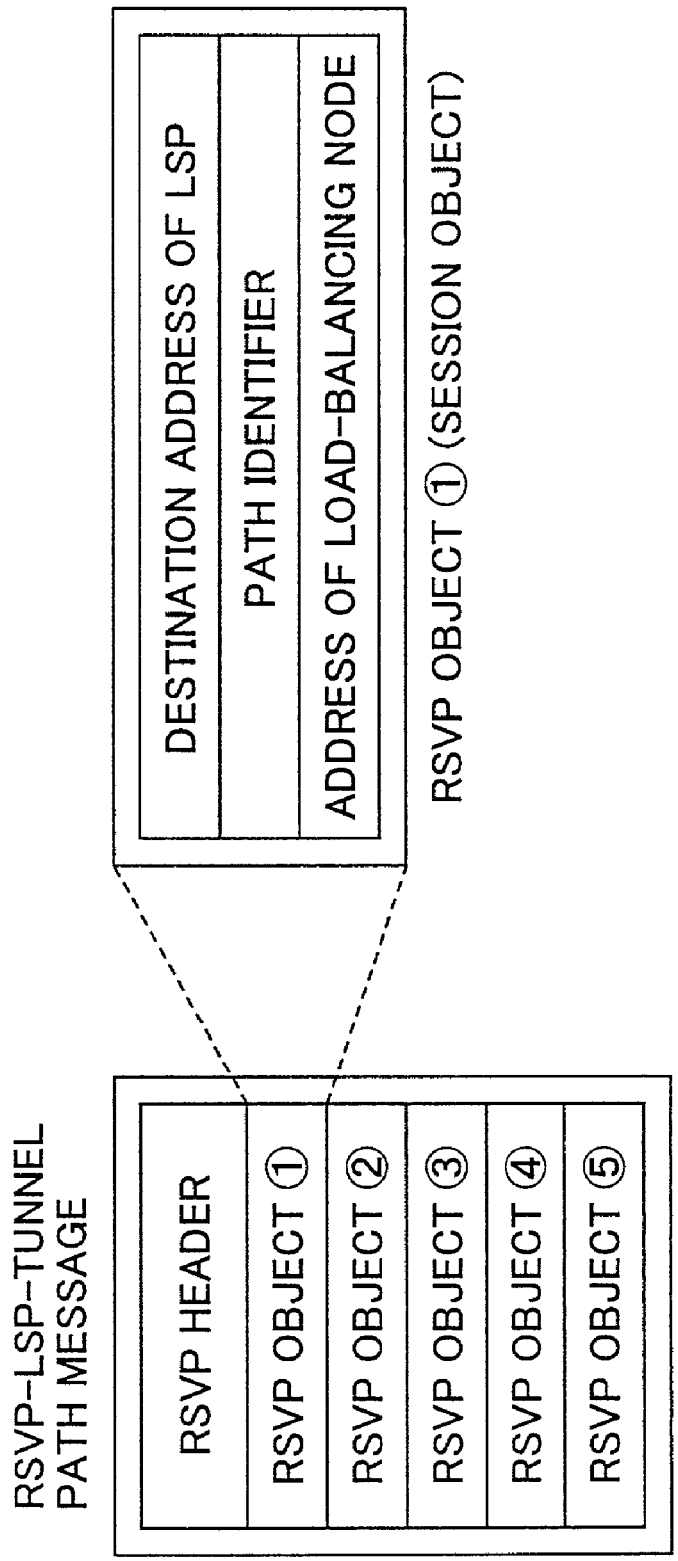
FIG. 27 is a diagram showing a structure of a "Resv Tear" message of a RSVP-LSP-Tunnel.
Figure 28:
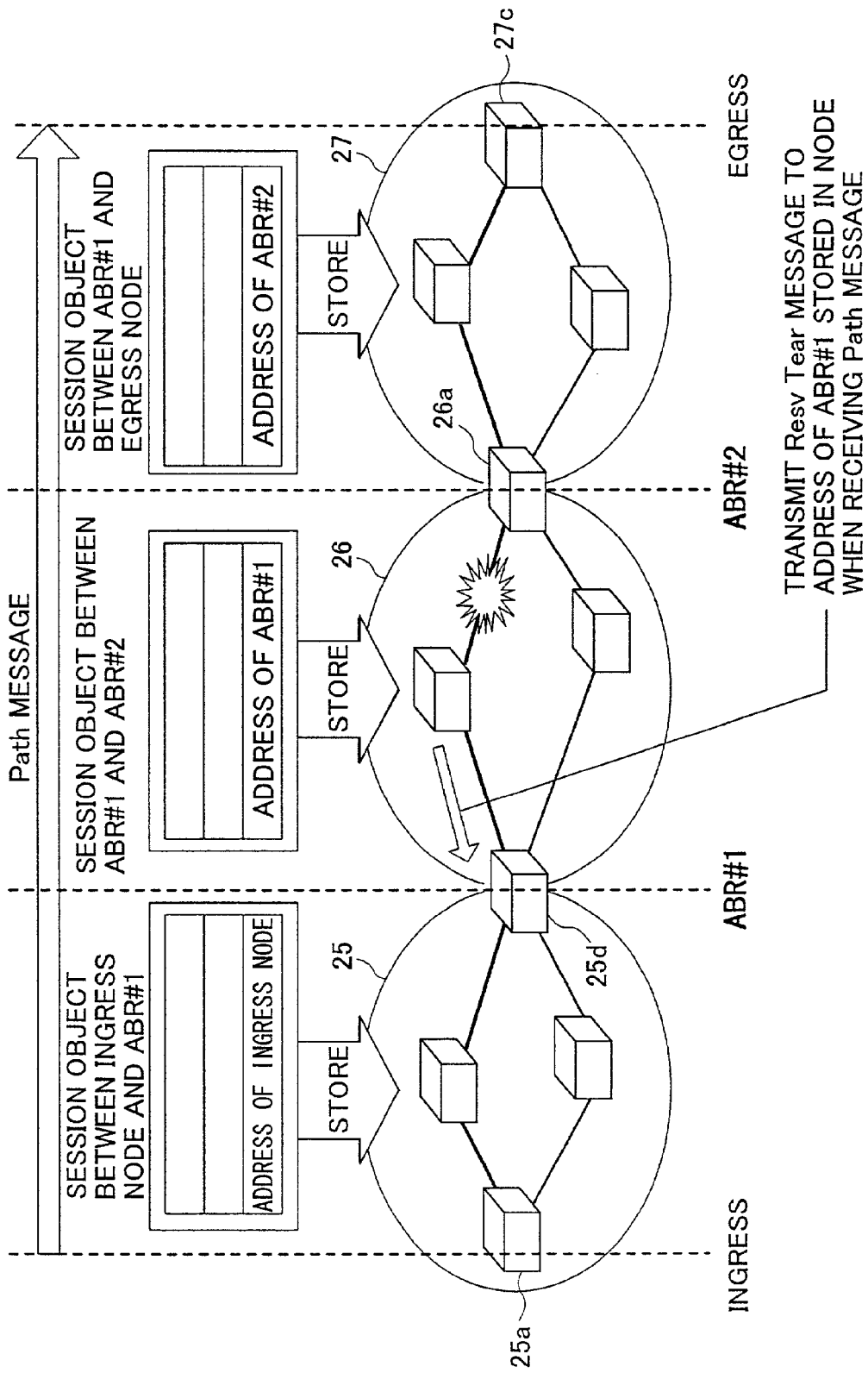
FIG. 28 is a diagram showing a process to store an address of the load-balancing node in each node by use of a "Path" message.

The load-balancing node can be notified of the failure, for instance, by transmitting a "Resv Tear" message of the RSVP-LSP-Tunnel shown in FIG. 27, from the L2 interface unit 51 of the node having detected the failure to the load-balancing node. Alternatively, the load-balancing node can be notified of the failure by a failure notifying method using hop-by-hop for each link, or by setting an LSP used for notifying the failure on a direction opposite of the traffic. In the case of using the Resv Tear message, an address of the load-balancing node is set inside a SESSION object of a "Path" message transmitted for setting a packet forwarding path, for example. The address of the load-balancing node included in the Path message is replaced in order, every time the Path message passes through the load-balancing node, as shown in FIG. 28. Each node on the packet forwarding path stores the address of the load-balancing node therein when the Path message passes through the each node. Accordingly, when a node detects a failure on the packet forwarding path, the node can notify the load-balancing node about the failure, by transmitting the Resv Tear message to the address of the load-balancing node stored in the node.

Figure 29:
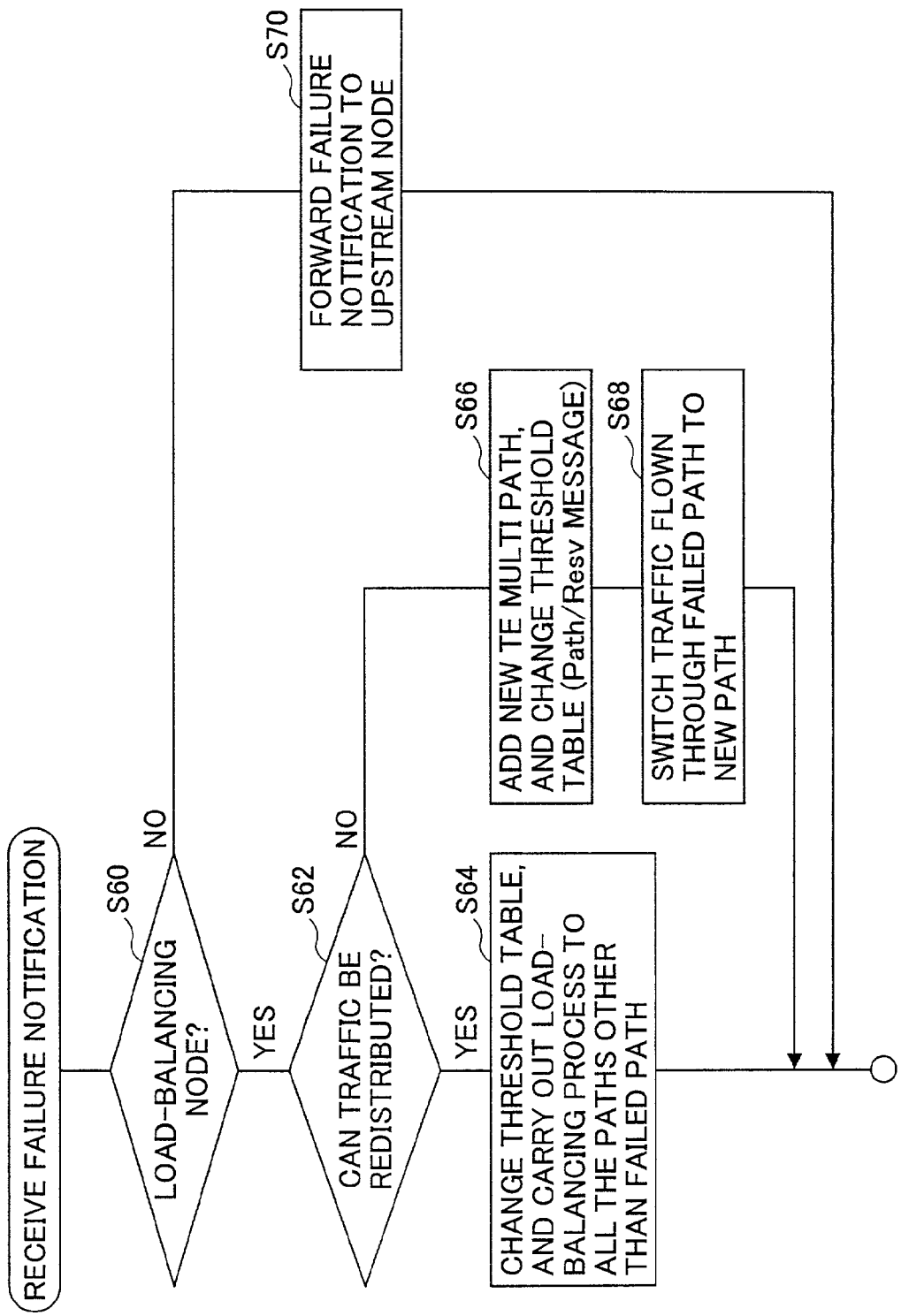
FIG. 29 is a flowchart showing a failure-notification receiving process carried out by the load-balancing node.

FIG. 29 is a flowchart showing the failure-notification receiving process carried out by the load-balancing node. A node initially receives a failure notification from a node located on the downstream side in an area. At a step S60 shown in FIG. 29, the node decides whether the node is a load-balancing node. If it is determined at the step S60 that the node is not the load-balancing node, the node at step S70 forwards the failure notification to a node located on the upstream side on the packet forwarding path. On the other hand, if it is determined at the step S60 that the node is the load-balancing node, the node proceeds to a step S62. At the step S62, the failure-notification receiving unit 40 (60) of the node determines whether the traffic flowing through the failed route can be redistributed to all the routes other than the failed route, by using a usage rate of each LSP collected during the load-balancing process.

Figure 30A:
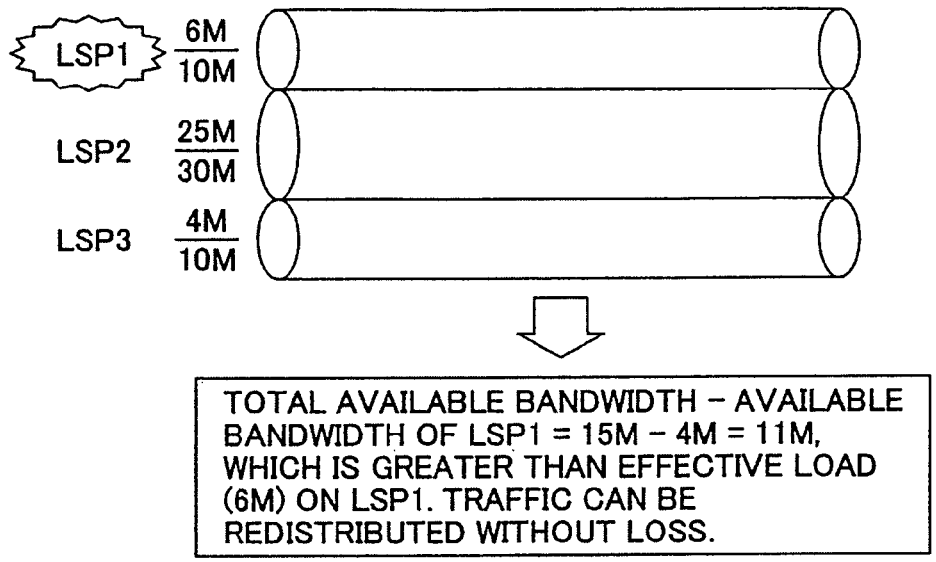
FIGS. 30A and 30B are diagrams showing a process to determine whether a traffic loss occurs because of redistribution of traffic.
Figure 31A:
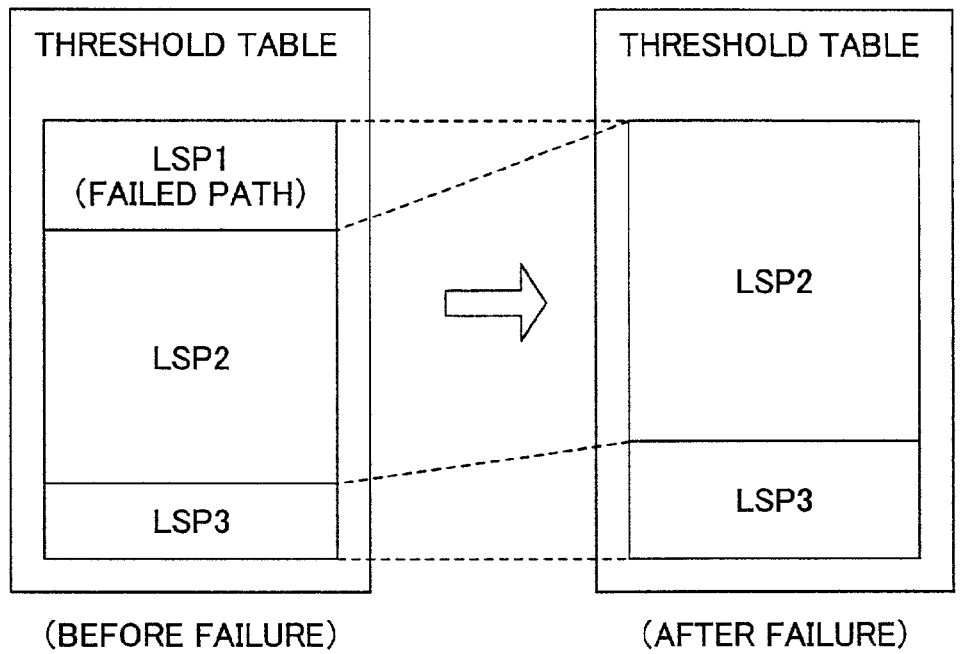
FIGS. 31A and 31B are diagrams showing a change in the threshold table because of the redistribution of the traffic.
Figure 32A:
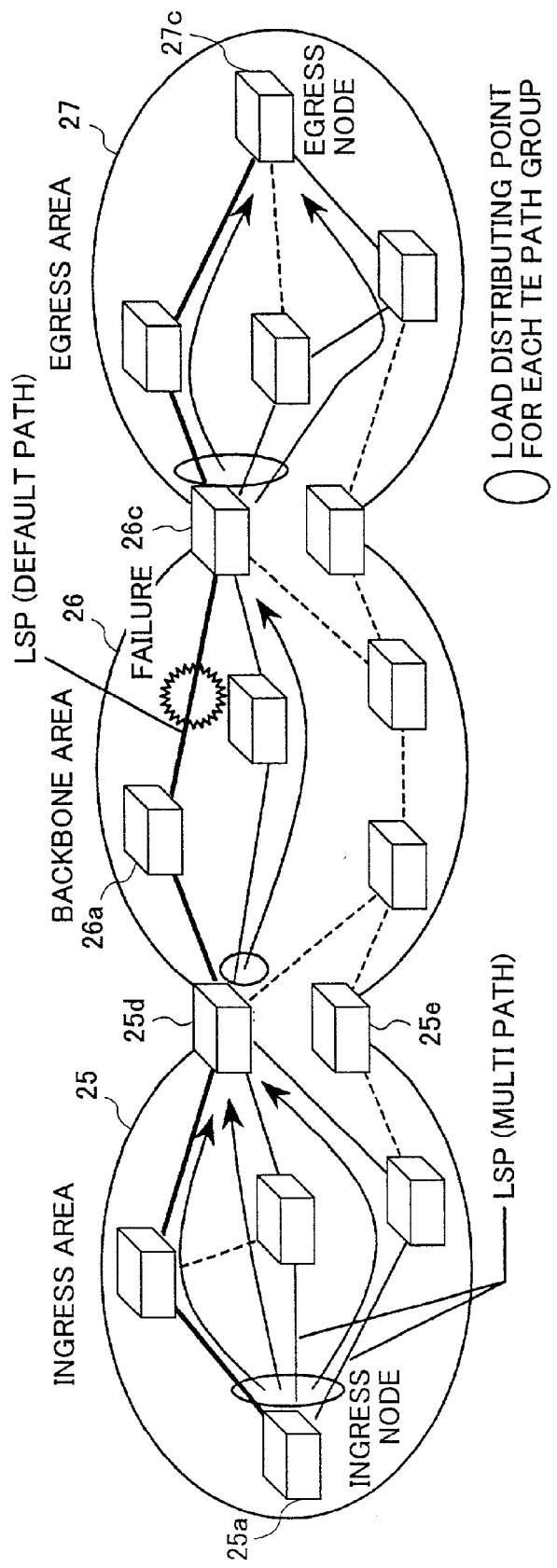
FIGS. 32A and 32B are diagrams showing load distribution after detecting the failure.

For example, a TE path group shown in FIG. 30A includes the paths LSP1, LSP2 and LSP3. The bandwidths of the paths LSP1, LSP2 and LSP3 are respectively 10 Mbps, 30 Mbps and 10 Mbps. Currently, 6 Mbps of the path LSP1, 25 Mbps of the path LSP2 and 4 Mbps of the path LSP3 are used. Now, it is assumed that a failure occurs on the path LSP1 during the load-balancing process using usage rates shown in FIG. 30A. In such a case, an effective load (6 Mbps) on the path LSP1 is compared with a result of subtracting an available bandwidth (4 Mbps) of the path LSP1 from an available bandwidth (15 Mbps) of the entire TE path group. The result is larger than the effective load on the failed path LSP1. Thus, it is determined at the step S62 that a traffic loss does not occur by redistributing the traffic to flowing through the failed path LSP1, to the other paths LSP2 and LSP3. Subsequently, at a step S64, the traffic distributing unit 35 (55) redistributes the traffic to the paths LSP2 and LSP3. Meanwhile, the number of the load-distributing boundary values is decreased by one in the threshold table 46 (66), as shown in FIG. 31A, since an area corresponding to the path LSP1 is deleted. The area is, then, redistributed among the paths LSP2 and LSP3. This load distribution is shown in FIG. 32A.

Figure 30B:
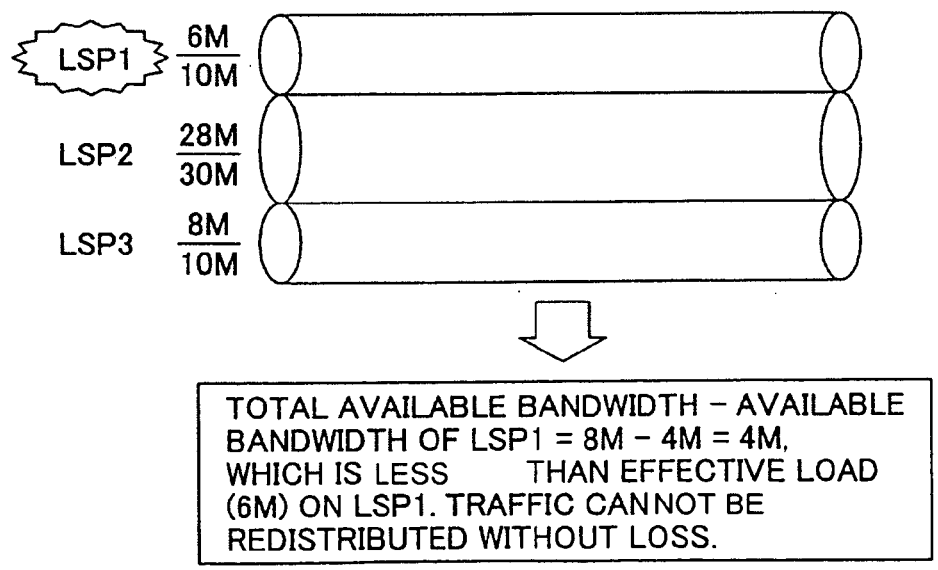
Figure 31B:
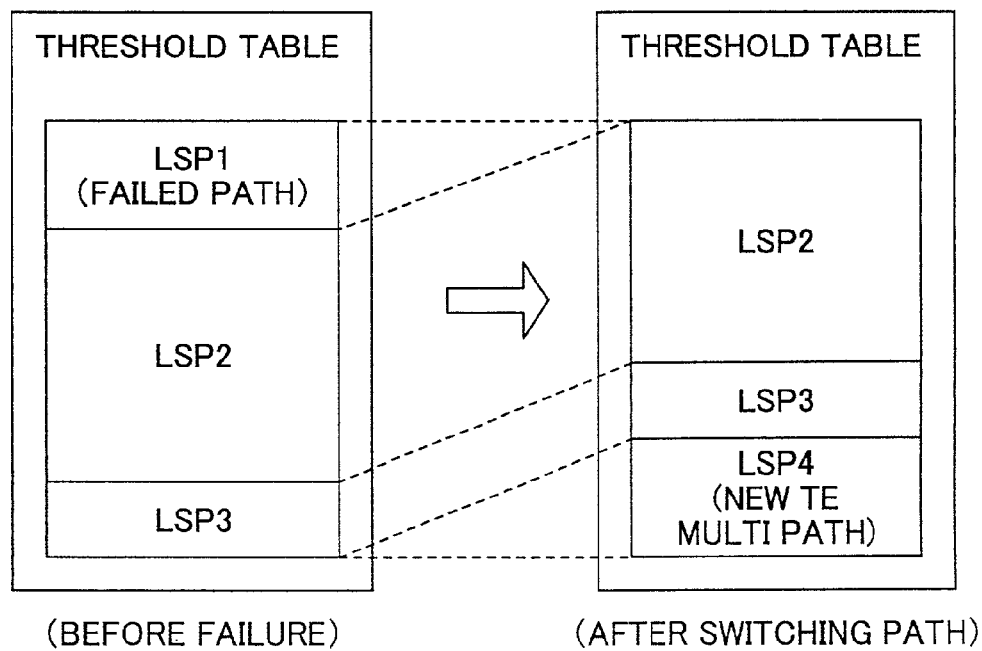
Figure 32B:
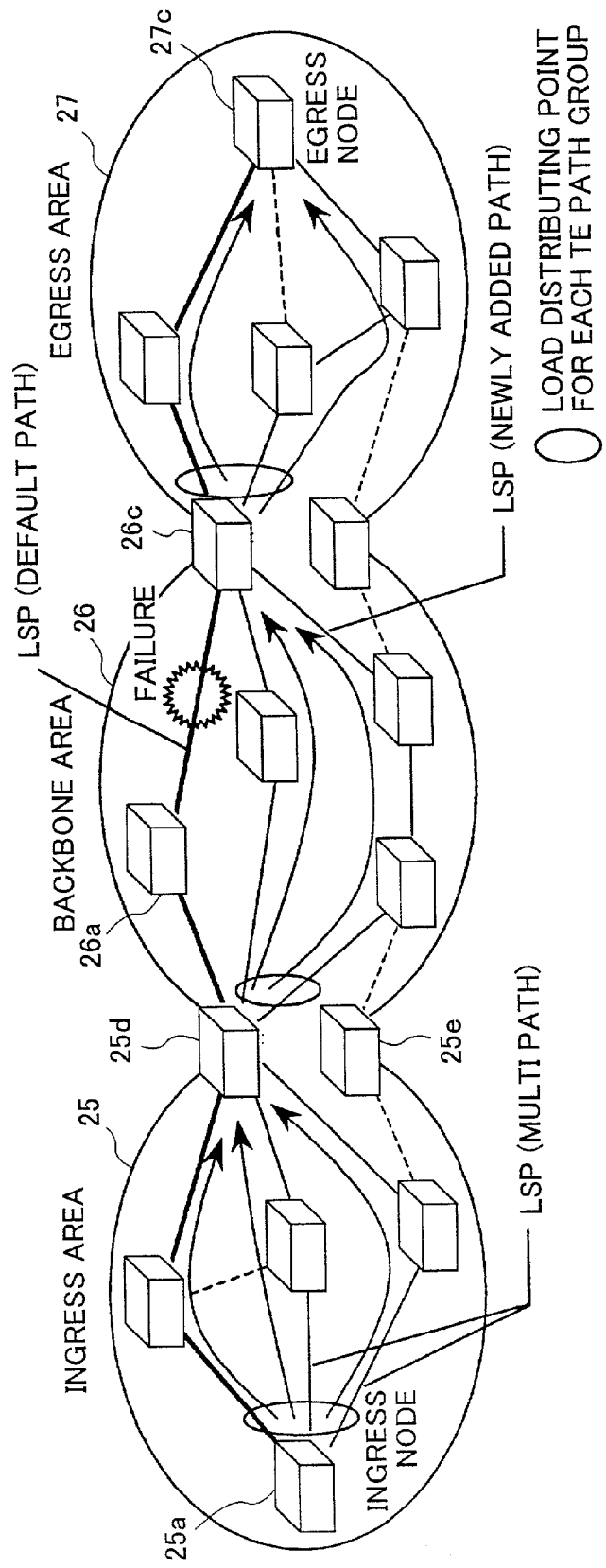

On the other hand, if it is determined at the step S62 that the traffic loss occurs by redistributing the traffic to the paths LSP2 and LSP2 as shown in FIG. 30B, the traffic distributing unit 35 (55) directs the path setting/releasing unit 43 (63) to add a new TE multi path LSP4 inside an area including the paths LSP2 and LSP3, at a step S66. A method of adding a new TE multi path is the same as the process to add a new TE multi path in the load-balancing process. After the new TE multi path LSP4 is added to the TE path group, the traffic distributing unit 35 (55) switches the traffic flowing through the failed path LSP1, to the new TE multi path LSP4, at a step S68. Meanwhile, the area corresponding to this TE path group is changed, as shown in FIG. 31B. Additionally, the above-described process is also shown in FIG. 32B.

By taking the above-described processes, a node apparatus using the traffic engineering method according to the present invention can relieve a traffic loss speedily when a failure occurs on a path, on which the load-balancing process is being performed. For example, in a case in which a failure occurs on a route during a service such as a Tenet using the TCP between users through an OSPF network, a connection between the users is possibly cut since the users cannot receive an "Ack" message normally until the failure is detected and fixed. On the other hand, the disconnection can be avoided by performing a high-speed failure detection and traffic relief, according to the present invention.

Additionally, by carrying out the load-balancing process in each closed area in a large-size routing protocol network using a concept of hierarchy such as areas of the OSPF, each node in the area only needs to hold all the traffic data (information) in the area, and does not need to hold data of all the areas used for the traffic engineering. Therefore, a memory capacity required by the load-balancing node can be reduced by a large amount, and the most appropriate traffic engineering can be achieved in the large-size network, whereas the traffic engineering cannot be achieved by an existing technology.

Additionally, an edge node calculates a normalized value used for the load-balancing process, based on a source address and a destination address, and supplies the normalized value to an area boundary node, which carries out the load-balancing process by using the normalized value. Thus, the area boundary node does not need to identify protocols such as an IP protocol and an IPX protocol, and to check a header of the IP protocol or the like, thereby enabling the load-balancing process in the fast forwarding while taking advantages of the cut-through packet forwarding method.

Additionally, in a case in which a failure occurs on a route while carrying out the load-balancing process by use of a plurality of routes, a node detecting the failure notifies the load-balancing node about the failure. Subsequently, the load-balancing node distributes the traffic flowing through the failed route, to the plurality of routes other than the failed route, thereby enabling the fast relief of the traffic loss caused by the traffic flowing through the failed route. In the related-art technology, a connection needs to be rebuilt in accordance with a user trigger after a change occurs. On the other hand, according to the present invention, the traffic loss can be relieved speedily, and, thus, aggregated micro flows of a TCP connection or the like can be relieved.

Further, if the load-balancing node having received a failure notification determines that the traffic loss occurs by distributing the traffic flowing through the failed route, to the plurality of routes other than the failed route, the load-balancing node sets a new route, and switches the traffic flowing through the failed route, to the new route. Accordingly, the present invention can provide a highly reliable connectionless packet forwarding service, which can relieve the traffic flowing through the failed route even if routes other than the failed route have high traffic.

According to the present invention, the load-balancing process is performed in each area separately. In detail, a node apparatus in an area has an inside-area destination deciding unit used for deciding a destination of a packet in the area, in order to carry out the load-balancing process within the area. Thus, the load-balancing process can be performed within each area separately, and a memory capacity required by the load-balancing node is reduced by a large amount even in a large-size network, thereby achieving the high-speed load-balancing process.

Additionally, a node apparatus corresponding to an ingress node supplied with a packet from the outside has a normalized-value calculating unit that calculates a normalized value used for the load-balancing process, based on address information included in the packet. Additionally, the node apparatus corresponding to the ingress node has a switching-information creating unit that adds the normalized value to switching information of the packet. Therefore, the node apparatus corresponding to the ingress node can notifies an area boundary node about the normalized value.

Additionally, a node apparatus corresponding to an area boundary node located on a boundary of areas has a normalized-value extracting unit that extracts the normalized value used for carrying out the load-balancing process within an area including the area boundary node, from the switching information of the packet supplied from an adjacent area. Consequently, the area boundary node can carry out the load-balancing process by use of the normalized value, and does not need to identify a protocol or to check a header of the protocol. Accordingly, the area boundary node can carry out the high-speed load-balancing process.

A node apparatus in an area has a failure notifying unit that notifies the closest load-balancing node on the upstream side in the area about the failure if detecting the failure. Thus, the load-balancing node can distribute the traffic flowing through a failed path speedily.

The ingress node or the area boundary node has a traffic distributing unit that redistributes the traffic flowing through the failed path, to paths other than the failed path, thereby relieving the traffic loss of the traffic flowing through the failed path speedily.

Additionally, the ingress node or the area boundary node has a failure-notification receiving unit deciding whether the traffic loss occurs by redistributing the traffic flowing through the failed path, to the paths other than the failed path, and, thus, the ingress node or the area boundary node can recognize whether the traffic flowing through the failed path can be redistributed to the paths other than the failed path.

If the failure-notification receiving unit decides that the traffic loss occurs by redistributing the traffic flowing through the failed path, to the paths other than the failed path, the traffic distributing unit switches the traffic flowing through the failed path, to a newly set path. Thus, the traffic distributing unit can relieve the traffic flowing through the failed path, even if the paths other than the failed path have high traffic.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-389077, filed on Dec. 21, 2000, the entire contents of which are hereby incorporated by reference.

What is claimed is:

1. A traffic engineering method of a network divided into a plurality of areas, each area including a plurality of nodes, said method comprising the steps of:
   carrying out a load-balancing process at a boundary node in said each area in a closed manner;
   calculating a normalized value used for the load-balancing process, based on address information of a packet supplied to an ingress node of the network from outside of the network;
   adding said normalized value to switching information of said packet;
   forwarding said packet from said ingress node to the plurality of nodes;
   receiving said packet from said ingress node at an area boundary node located on a boundary of the plurality of areas;
   extracting said normalized value, used for carrying out the load-balancing process in an area including said area boundary node, from the switching information of said packet;
   redistributing a traffic flow from a failed route to a route other than the failed route if receiving a failure notification at said ingress node or said area boundary node;
   deciding whether a traffic loss occurs by redistributing the traffic flow from said failed route to the route other than said failed route; and
   setting a new route and switching the traffic flow to the new route when it is decided at said deciding step that the traffic loss occurs by redistributing the traffic flow from said failed route to the route other than said failed route.

2. The traffic engineering method as claimed in claim 1, further comprising the step of deciding a destination of a packet in said each area.

3. The traffic engineering method as claimed in claim 1, further comprising the step of notifying a closest node apparatus that carries out the load-balancing process and is the closest to said node apparatus on an upstream side of said node apparatus, about a failure if detecting the failure.

4. A node apparatus included in a network that is divided into a plurality of areas and located at a boundary of one of the plurality of areas, in which an entire network resource is optimized by traffic engineering by deciding a destination of a packet in each area, the node apparatus comprising:
   a load balancing unit configured to use said destination for carrying out a load-balancing process within said each area in a closed manner;

a normalized-value extracting unit, which extracts a normalized value, used for carrying out the load-balancing process in an area including said node apparatus, from switching information of a packet supplied from an adjacent area;

a traffic distributing unit that redistributes a traffic flow from a failed route to a route other than the failed route if receiving a failure notification; and a failure-notification receiving unit that decides whether a traffic loss occurs by redistributing the traffic flow from said failed route to the route other than said failed route, wherein said traffic distributing unit switches the traffic flow from said failed route to a newly set route when said failure-notification receiving unit decides that the traffic loss occurs by redistributing the traffic flow from said failed route to the route other than said failed route.

5. The node apparatus as claimed in claim 4, wherein said node apparatus corresponding to an ingress node supplied with the packet from outside of the network includes a normalized-value calculating unit that calculates a normalized value used for the load-balancing process based on address information of said packet, and a switching-information creating unit that adds said normalized value to switching information of said packet.

6. The node apparatus as claimed in claim 4, further comprising a failure notifying unit that notifies a closest node apparatus that carries out the load-balancing process and is the closest to said node apparatus on an upstream side of said node apparatus, about a failure if detecting said failure.

7. A network system, comprising:
a plurality of areas, each area including a plurality of nodes, wherein
an entire network resource is optimized by traffic engineering,
a load-balancing process is carried out at a boundary node in said each area in a closed manner,
a normalized value, used for the load-balancing process, is calculated based on address information of a packet supplied to an ingress node of the network from outside of the network;
said normalized value is added to switching information of said packet;
said packet is forwarded from said ingress node to the plurality of nodes;
said packet is received from said ingress node at an area boundary node located on a boundary of the plurality of areas;
said normalized value is extracted, for carrying out the load-balancing process in an area including said boundary node, from switching information of the packet;
a traffic flow is redistributed from a failed route to a route other than the failed route if receiving a failure notification at said ingress node or said area boundary node,
a decision is made on whether a traffic loss occurs by redistributing the traffic flow from said failed route to the route other than said failed route; and
a new route is set and the traffic flow is switched to the new route when the decision is made that the traffic loss occurs by redistributing the traffic flow from said failed route to the route other than said failed route.

8. A traffic engineering method in a network, comprising:
dividing said network into a plurality of areas, each area including a plurality of nodes comprising an edge node and at least one boundary node; and
carrying out a load-balancing process at said boundary node in said each area independently;
calculating a normalized value used for the load-balancing process, based on address information of a packet supplied to an ingress node of the network from outside of the network;
adding said normalized value to switching information of said packet;
forwarding said packet from said ingress node to the plurality of nodes;
receiving said packet from said ingress node at an area boundary node located on a boundary of the plurality of areas;
extracting said normalized value, used for carrying out the load-balancing process in an area including said area boundary node, from the switching information of said packet;
redistributing a traffic flow from a failed route to a route other than the failed route if receiving a failure notification at said ingress node or said area boundary node;
deciding whether a traffic loss occurs by redistributing the traffic flow from said failed route to the route other than said failed route; and
setting a new route and switching the traffic flow to the new route when it is decided at said deciding step that the traffic loss occurs by redistributing the traffic flow from said failed route to the route other than said failed route.

* * * * *